(12) United States Patent
Jeong et al.

(10) Patent No.: US 8,943,890 B2
(45) Date of Patent: *Feb. 3, 2015

(54) INERTIAL SENSOR

(75) Inventors: Heewon Jeong, Tokyo (JP); Hiroshi Fukuda, London (GB)

(73) Assignee: Hitachi, Ltd., Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 13/563,557

(22) Filed: Jul. 31, 2012

(65) Prior Publication Data

US 2012/0291546 A1  Nov. 22, 2012

Related U.S. Application Data

(63) Continuation of application No. 12/189,920, filed on Aug. 12, 2008, now Pat. No. 8,250,916.

(51) Int. Cl.
*G01P 15/097* (2006.01)
*G01C 19/5719* (2012.01)
*G01P 15/125* (2006.01)

(52) U.S. Cl.
CPC .......... *G01P 15/097* (2013.01); *G01C 19/5719* (2013.01); *G01P 15/125* (2013.01)
USPC ..................................... 73/504.04; 73/504.12

(58) Field of Classification Search
USPC ................ 73/504.04, 504.08, 504.12, 504.02
See application file for complete search history.

(56) References Cited

U.S. PATENT DOCUMENTS

| | | | |
|---|---|---|---|
| 5,349,855 A | 9/1994 | Bernstein et al. | |
| 6,230,563 B1 * | 5/2001 | Clark et al. | 73/504.04 |
| 6,557,414 B2 | 5/2003 | Sakurai et al. | |
| 6,584,840 B2 | 7/2003 | Tsugai et al. | |
| 6,701,786 B2 * | 3/2004 | Hulsing, II | 73/514.02 |
| 6,845,665 B2 * | 1/2005 | Geen | 73/504.04 |
| 6,981,414 B2 * | 1/2006 | Knowles et al. | 73/504.12 |
| 7,168,317 B2 | 1/2007 | Chen et al. | |
| 7,513,155 B2 | 4/2009 | Jeong et al. | |
| 7,984,648 B2 | 7/2011 | Horning et al. | |
| 8,342,023 B2 * | 1/2013 | Geiger | 73/504.12 |
| 2001/0029784 A1 * | 10/2001 | Kurachi et al. | 73/504.02 |
| 2009/0056444 A1 * | 3/2009 | Jeong et al. | 73/504.14 |

FOREIGN PATENT DOCUMENTS

| | | |
|---|---|---|
| JP | 2000-146595 A | 5/2000 |
| JP | 2002-188923 A | 7/2002 |
| JP | 2004-004119 A | 1/2004 |
| JP | 2007-333467 A | 12/2007 |
| WO | WO 02/066927 A1 | 8/2002 |
| WO | WO 2004/097430 | 11/2004 |

* cited by examiner

*Primary Examiner* — Hezron E Williams
*Assistant Examiner* — Xin Zhong
(74) *Attorney, Agent, or Firm* — Miles & Stockbridge PC

(57) ABSTRACT

One inertial sensor detects an acceleration in a driving direction as well as an angular rate about one axis and an acceleration in a detecting direction at the same time. A driving-direction acceleration detecting unit is provided to members vibrating in mass members on the left and right via an elastic body. In this manner, when an acceleration is applied in the driving direction, the mass members on the left and right normally vibrated with a same amplitude and in opposite phases have displacement amounts in a same phase, and the driving-direction acceleration detecting unit detects the displacement amounts in the same phase as a capacitance change, thereby detecting the acceleration in the driving direction.

13 Claims, 11 Drawing Sheets

INERTIAL SENSOR

CROSS-REFERENCE TO RELATED APPLICATION

This application is a continuation of application Ser. No. 12/189,920 filed Aug. 12, 2008 now U.S. Pat. No. 8,250,916.

TECHNICAL FIELD OF THE INVENTION

The present invention relates to a technique for an inertial sensor. More particularly, the present invention relates to a technique effectively applied to a MEMS inertial sensor manufactured by a MEMS (Micro Electro Mechanical System) technique.

BACKGROUND OF THE INVENTION

An example of a conventional inertial sensor is shown in FIG. 13. In this inertial sensor, a mass member 500 is fixed to a basement layer by a support 502 via a beam 501. The mass members 500 on the left and right vibrate in opposite phases in an X-axis direction, and move in a Z-axis direction when an angular rate about a Y axis or an acceleration in a Z direction (detecting direction) is applied. An amount of the movement in the Z-axis direction is detected by a detecting member 504 as an angular rate or an acceleration.

A driving member 503 of this kind of inertial sensor is formed by a capacitive element in which a fixed electrode part and a movable electrode part are arranged so as to have their comb teeth engaged with each other, and a electrostatic attractive force is alternately generated between the fixed electrode part and the movable electrode part by applying a driving signal of alternative current having a proper phase difference with a bias voltage of direct current across the fixed electrode part and the movable electrode part, so that the mass members 500 on the left and right are vibrated in opposite phases to each other.

Further, the detecting member 504 has the mass member 500 as a movable electrode, and a fixed electrode is arranged on the basement layer side so as to face to the movable electrode part so that a detected signal in accordance with the angular rate and the acceleration is outputted by detecting the amount of movement in the Z direction of the mass member 500 as a capacitance change.

Here, the mass members 500 on the left and right are vibrated in opposite phases to each other, and thus the amount of movement in the Z direction by Coriolis force also has opposite phases when an angular rate about the Y axis is applied. However, in the case where an acceleration in the Z-axis direction is applied, the mass members 500 are moved in the Z-axis direction in the same phase regardless of the vibration in the X-axis direction. Therefore, the applied acceleration can be measured by adding the capacitance change signals detected from the two mass members to one another. Moreover, an acceleration component can be eliminated by subtracting the capacitance change signal from another, thereby measuring the applied angular rate.

For example, an angular rate sensor known from Japanese Patent Application Laid-Open Publication No. 2004-004119 (Patent Document 1) has a configuration where a pair of mass members arranged on a basement layer are vibrated in opposite directions to each other, so that an acceleration component is eliminated with accuracy when detecting a differential of yaw rates detected from the respective two mass members.

Further, a mechanical quantity detecting device known from Japanese Patent Application Laid-Open Publication No. 2002-188923 (Patent Document 2) has a configuration where a pair of mass members arranged on a basement layer are vibrated (tuning-fork vibration) in opposite phases to each other, so that an applied angular rate and an acceleration works in a detecting direction are separated by comparing a difference in phases of signals respectively detected from the two mass members.

Moreover, an angular rate sensor described in WO02/066927 (Patent Document 3) is formed by a drive frame, a Coriolis frame, and a detection frame, where the drive frame is supported by a beam that is flexible in a driving direction and rigid in a detecting direction, thereby easily moving in the driving direction and hardly moving in the detecting direction.

SUMMARY OF THE INVENTION

Meanwhile, any of the inertial sensors that the inventors of the present invention has studied can measure or distinguish the acceleration in the detecting direction as well as the angular rate at the same time in the detecting direction, but they cannot measure the acceleration in the driving direction.

Therefore, in the case where the acceleration in the driving direction is required to be measured with the angular rate, an acceleration sensor is necessary to be used separately with an angular rate sensor. In this case, it is required to form an angular sensor and an acceleration sensor on a basement layer, and thus it poses a problem that the inertial sensor is unable to be smaller.

In addition, the acceleration applied in the driving direction poses problems giving adverse effects to the property of the inertial sensor such as deteriorating the linearity of the beam. That is, the acceleration in the driving direction cannot be detected simultaneously, and thus a displacement error due to biasing of the mass member by the acceleration in the driving direction cannot be corrected. Therefore, it becomes difficult to maintain the stable vibration in the driving direction, and it poses a problem of deteriorating detection accuracy of the angular rate.

Accordingly, an object of the present invention is to provide a technique capable of measuring an acceleration in a driving direction at the same time as well as measuring an angular rate and an acceleration in a detecting direction for detecting the angular rate.

The above and other objects and novel features of the present invention will be apparent from the description of this specification and the accompanying drawings.

The typical ones of the inventions disclosed in this application will be briefly described as follows.

An inertial sensor according to the present invention comprises (a) a basement layer having a main surface and (b) a first sensor unit and a second sensor unit which are arranged in a first direction on the main surface of the basement layer, and the first sensor unit and the second sensor unit respectively comprise (b1) a drive frame vibrating in a driving direction that is the first direction and (b2) a driving member that vibrated the drive frame in the driving direction, where the drive frame of the first sensor unit and the drive frame of the second sensor unit are vibrated in the opposite phases, and there is further comprised (c) a driving-direction acceleration detection unit detecting an acceleration in the driving direction that is connected to the drive frame of the first sensor unit and the drive frame of the second sensor unit via an elastic body.

The effects obtained by typical aspects of the present invention will be briefly described below.

More particularly, in the inertial sensor, the driving-direction acceleration detecting unit being connected between a plurality of mass members (drive frames) vibrating in opposite phases via the elastic body is provided, thereby detecting the acceleration in the driving direction from a displacement amount of same phase of the plurality of mass members. Therefore, as well as an angular rate and an acceleration in a detecting direction for detecting the angular rate, the acceleration in the driving direction for generating basic vibrations for measuring the angular rate can be measured at the same time.

Further, since the acceleration in the driving direction can be measured or distinguished, it is possible to correct a displacement error due to bias of the mass member made by the acceleration, and maintain a driving vibration which is strong against disturbance and always stable, thereby improving a detection accuracy of the angular rate.

BRIEF DESCRIPTIONS OF THE DRAWINGS

DESCRIPTIONS OF THE PREFERRED EMBODIMENTS

Figure 1:
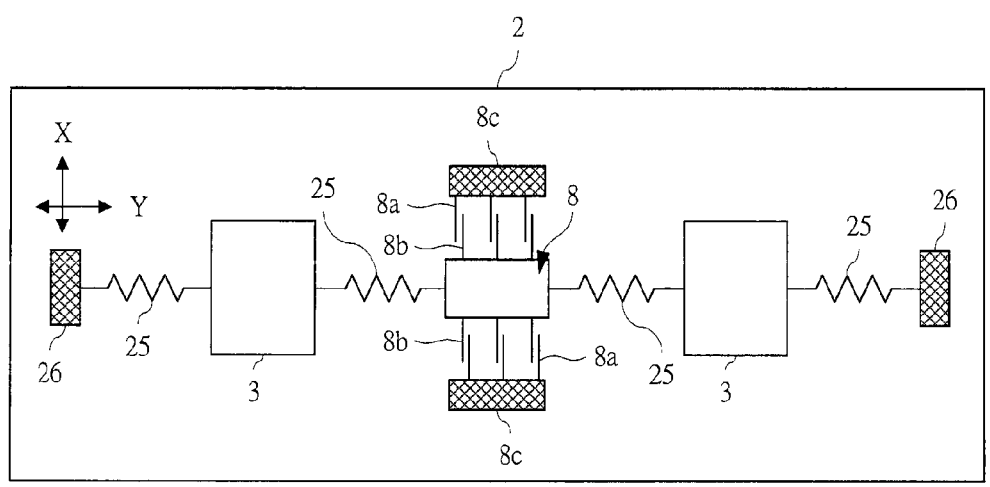
FIG. 1 is an explanatory diagram for describing a fundamental concept of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above. Also, components having the same function are denoted by the same reference symbols throughout the drawings for describing the embodiments, and the repetitive description thereof is omitted. Hereinafter, embodiments of the present invention will be described with reference to the accompanying drawings.

First Embodiment

An inertial sensor of a first embodiment is a sensor which measures a physical amount occurring from an inertia of an object, such as an acceleration and an angular rate (gyro). In the first embodiment, an inertial sensor capable of measuring an angular rate and accelerations (an acceleration in a detecting direction and that of a driving direction) at the same time will be described as an example.

First, the fundamental principle of an inertial sensor will be described. When an angular rate $\Omega$ is applied to a mass member having a weight m that vibrates in a first direction (driving direction) about an axis orthogonal to the driving direction (driving axis), Coriolis force described with the following Equation 1 is generated in a direction of a detecting direction (detecting axis) orthogonal to the driving axis and the axis to which an angular rate is applied. The inertial sensor detects the angular rate $\Omega$ using the principle of the mass member being displaced in the detecting direction by this Coriolis force. That is, the larger the angular rate is, the larger Coriolis force is, and an amount of displacement in the detecting direction differs in accordance with the Coriolis force. Therefore, the angular rate can be measured by detecting the displacement amount in the detecting direction. The displacement amount of the mass member by Coriolis force is shown with the following Equation 3. Further, the displacement amount of the mass member in the case where an acceleration is applied is shown with the following Equation 4. The displacement amounts of the mass can be outputted as values of applied acceleration and angular rate using a detecting unit capable of detecting, for example, a change of electrostatic capacities.

$$Fc = 2m\Omega v \qquad \text{Equation 1}$$

Where: Fc: Coriolis force, m: mass of a mass member, $\Omega$: angular rate, and v: velocity in a driving direction of a mass member. The velocity v is a first order derivative of a displacement amount y in the driving direction, and is defined in Equation 2.

$$v = y' = A\omega \cos(\omega t) \qquad \text{Equation 2}$$

Where: y: displacement amount in the driving direction, A: maximum value of an amplitude in the driving direction, and $\omega$: angular frequency in the driving direction.

$$x = Qs(Fc/k_{sense}) \qquad \text{Equation 3}$$

Where: x: displacement value in a detecting direction of a mass member according to Coriolis force, Qs: quality factor in a direction of a detection axis, and $k_{sense}$: constant of value in the detecting direction $$x = A(ma/k_{sense}) \quad \text{Equation 4}$$

Where: x: displacement value in a detecting direction of a mass by the application of acceleration, a: acceleration, and A: constant including effects of damping due to, e.g., air.

First, a method of detecting an angular rate Ω will be explained with Equation 1 to Equation 3. It is understood that the Coriolis force Fc is defined by a mass m of the mass member, an angular rate Ω, and a velocity "v" in the driving direction from Equation 1. Therefore, the angular rate Ω can be detected when the mass "m" of the mass member and the velocity v in the driving direction are known. Here, the mass "m" of the mass member is known. And, the velocity v in the driving direction is the first order derivative of a displacement amount "y" in the driving direction as shown by Equation 2, and since the vibration in the driving direction is a known reference vibration, the velocity v in the driving direction can be obtained.

Next, about the Coriolis force Fc, the Coriolis force Fc satisfies the relation of Equation 3. In Equation 3, the quality factor Qs in the detecting direction and the spring constant in the detecting direction are constants, the Coriolis force Fc can be obtained when the displacement amount x in the detecting direction is known. According to the foregoing, when the displacement amount x in the detecting direction is able to be measured, the Coriolis force Fc is obtained by Equation 3, and the angular rate Ω is obtained by Equation 1 when the Coriolis force Fc is known. In other words, the angular rate Ω can be obtained by measuring the displacement amount x in the detecting direction. To measure the displacement amount x in the detecting direction, for example, a capacitive element arranged in a comb-teeth fashion is used, and a distance between electrodes forming the capacitive element is changed in accordance with a change in the displace amount x in the detecting direction, so that the displacement amount x in the detecting direction is obtained as a change in capacitance of the capacitive element. In this manner, the angular rate Ω can be measured.

Next, a method of detecting the acceleration in the detecting direction will be explained using Equation 4. As shown by Equation 4, it is understood that the displacement amount x in the detecting direction of the mass member by the applied acceleration a is in a proportional direction with the acceleration "a" in the detecting direction. Therefore, the acceleration in the driving direction can be obtained by measuring the displacement amount in the detecting direction. The displacement amount x in the detecting direction can be obtained from a change in capacitance of the capacitive element as described above.

Subsequently, a method of detecting the acceleration in the driving direction can be obtained as same as that of the method of detecting the acceleration in the detecting direction. That is, since the displacement amount in the driving direction and the acceleration in the driving direction are in a proportional relationship, acceleration in the driving direction can be obtained by measuring the displacement amount in the driving direction. The displacement amount in the driving direction can be also obtained from a change in capacitance of the capacitive element as described above.

According to the foregoing, it is understood that the angular rate, the acceleration in the detecting direction, and the acceleration in the driving direction can be obtained by a principled manner, respectively. In the first embodiment, there will be described an inertial sensor capable of simultaneously obtaining the angular rate, the acceleration in the detecting direction, and the acceleration in the driving direction described above. In other words, one feature of the present invention lies in that the inertial sensor is capable of detecting an angular rate, an acceleration in a detecting direction, and an acceleration in a driving direction at the same time.

FIG. 1 is a diagram schematically showing a configuration of the inertial sensor according to the first embodiment. With reference to FIG. 1, the inertial sensor of the first embodiment will be briefly described. As shown in FIG. 1, supports 26 are provided on a basement layer 2. And, two mass members (drive frames) 3 are provided between the supports 26 along a Y-axis direction (first direction), and one side of the mass member 3 is connected to each of the supports 26 via an elastic body 25. A sensor unit is formed so as to include the respective two mass members 3 on the left and right. For example, the sensor unit including the mass member 3 on the left is called "a first sensor unit," and the sensor unit including the mass member 3 on the right is called "a second sensor unit." A driving member (not shown) that vibrates the mass member 3 in the driving direction is provided to each of the first sensor unit and the second sensor unit. The driving member has a configuration for vibrating the mass member 3 in the driving direction by using electrostatic attractive force by the capacitive element, for example. And, a driving-direction acceleration detecting unit 8 is provided between the respective mass members 3 via the elastic bodies 25. That is, the driving-direction acceleration detecting unit 8 is formed between the first sensor unit and the second sensor unit. A movable electrode 8b is formed to the driving-direction acceleration detecting unit 8. The movable electrode 8b forms a capacitive element with a fixed electrode 8a provided to a fixing member 8c. That is, the movable electrode 8b and the fixed electrode 8a are arranged in a comb-teeth fashion to form the capacitive element. In the inertial sensor of the first embodiment configured as the foregoing manner, the mass member 3 is made capable of vibrating in the driving direction (Y direction). Similarly, the driving-direction acceleration detecting unit 8 is also made capable of vibrating in the driving direction (Y-axis direction). Further, although not shown in FIG. 1, a Coriolis element is formed inside the mass member 3, and the Coriolis element is made capable of being displaced in the driving direction (Y-axis direction) and the detecting direction (X-axis direction). Moreover, a detecting member that detects a displacement amount of the Coriolis element in the detecting direction is also formed. The detecting member is also formed by a capacitive element arranged in a comb-teeth fashion.

The inertial sensor according to the first embodiment is configured as described in the foregoing, and an operation thereof will be described hereinafter. First, an operation for detecting the acceleration in the driving direction which is one feature of the present invention will be described.

First, the mass members 3 on the left and right are vibrated in opposite phases to each other in the driving direction (Y-axis direction). Since the mass members 3 on the left and right are vibrated in opposite phases to each other in the driving direction (Y-axis direction), the driving-direction acceleration detecting unit 8 connected between the mass members on the left and right via the elastic bodies 25 negates the displacement amount of the mass members 3 on the left and right when there is no acceleration applied in the driving direction (Y-axis direction). Therefore, the driving-direction acceleration detecting unit 8 is retained in a stopped state. Note that, when there are variations in the displacement amount of the mass members 3 on the left and right, the driving-direction acceleration detecting unit 8 is vibrated by the difference of the variations. However, the vibration is always constant, and it is possible to stop after a correction. Since the driving-direction acceleration detecting unit 8 is retained in the stopped state, the distance between the movable electrode 8b and the fixed electrode 8a is not changed, and the capacitance of the capacitive element is not changed. Therefore, the displacement amount in the driving direction becomes zero, and the acceleration in the driving direction is detected as being zero.

Subsequently, when an acceleration is applied in the driving direction (Y-axis direction), the mass members 3 on the left and right are displaced in a same direction. That is, the mass members 3 on the left and right are displaced in a same phase. Displacement amount thereof is an amount proportional to a magnitude of the acceleration applied to the mass members 3 in the same phase. Since the displacement amounts at this time are in the same phase to each other, they are not negated by the driving-direction acceleration detecting unit 8, and the movable electrodes 8b of the driving-direction acceleration detecting unit 8 is displaced. Therefore, the distance between the movable electrode 8b and the fixed electrode 8a is changed. Thereby, the capacitance amount of the capacitive member comprising the movable electrode 8b and the fixed electrode 8a is changed. The displacement amount of the driving-direction acceleration detecting unit 8 can be obtained by measuring the change in capacitance of the capacitive element, thereby ultimately obtaining an acceleration applied in the driving direction.

In this manner, one feature of the present invention is to provide the driving-direction acceleration detecting unit 8 to the mass members 3 vibrating in opposite phases to each other via the elastic bodies 25. More particularly, as the driving-direction acceleration detecting unit 8 are connected to the mass members vibrating in opposite phases, it is possible to utilize the facts that the driving-direction acceleration detecting unit 8 is not displaced when an acceleration is not applied in the driving direction (Y-axis direction), and the driving-direction acceleration detecting unit 8 is displaced when an acceleration is applied in the driving direction (Y-axis direction). In this manner, the acceleration in the driving direction (Y-axis direction) can be detected by the inertial sensor having the mass members 3 vibrating in the driving direction (Y-axis direction) in opposite phases.

Next, an operation for detecting an angular rate by the inertial sensor according to the first embodiment will be described. First, the Coriolis elements on the left and right are vibrated in the driving direction in opposite phases to each other. It is assumed that a rotation is made about a central axis along a direction that is perpendicular to the driving direction (Y-axis direction) and the detecting direction (X-axis direction). Then, the Coriolis elements on the left and right are displaced in the detecting direction (X-axis direction) by the Coriolis force. The displacement amount in the detecting direction (X-axis direction) is largely dependent on the magnitude of the angular rate. By detecting the displacement amount in the detecting direction (X-axis direction) using, for example, by the detecting member formed by the capacitive element in comb-teeth shape as a change in capacitance, it is possible to detect the angular rate.

Subsequently, an operation for detecting an acceleration in the detecting direction (X-axis direction) by the inertial sensor according to the first embodiment will be described. When an acceleration is applied in the detecting direction (X-axis direction), the Coriolis elements on the left and right are displaced in the detecting direction (X-axis direction). The displacement amount is detected as a change in capacitance by, for example, the detecting member formed by the capacitive elements in a comb-teeth shape, and thus the acceleration in the detecting direction (X-axis direction) can be detected.

Here, it is assumed that a rotational movement about a central axis along a direction perpendicular to the driving direction (Y-axis direction) and the detecting direction (X-axis direction) and an acceleration in the detecting direction (X-axis direction) are applied at the same time. Then, the Coriolis frame is displaced in the detecting direction (X-axis direction) by the Coriolis force by the rotational movement, and the Coriolis frame is displaced in the detecting direction (X-axis direction) also by the acceleration in the detecting direction. Therefore, only measuring the displacement amount in the detecting direction (X-axis direction) cannot discrete the displacement amount by the rotational movement and the displacement amount by the acceleration applied in the detecting direction (X-axis direction). That is, the angular rate and the acceleration in the detecting direction (X-axis direction) cannot be obtained. Accordingly, the Coriolis frames connected to the mass members 3 on the left and right are vibrated in the driving direction (Y-axis direction) in opposite phases. In the case where the Coriolis frames on the left and right are vibrated in the driving direction (Y-axis direction) in opposite phases, the displacement amounts in the detecting direction (X-axis direction) by the Coriolis force are opposite per the Coriolis frames on the left and right. On the contrary, the displacement amounts of the Coriolis frames in the detecting direction (X-axis direction) by the acceleration applied in the detecting direction (X-axis direction) are in the same phase. By using this difference to take a difference in displacement amounts in the detecting direction (X-axis direction) of the Coriolis frames on the left and right, the displacement amounts in the same phase are negated and only the displacement amounts in opposite phases can be extracted. Therefore, by taking the difference of displacement amounts in the detecting direction (X-axis direction) of the Coriolis frames on the left and right, the angular rate in the rotational operation can be detected. Meanwhile, by adding the displacement amounts in the detecting direction (X-axis direction) of the Coriolis frames on the left and right, the displacement amounts in opposite phases are negated, and only the displacement amounts in the same phase can be extracted. Accordingly, by adding the displacement amounts in the detecting direction (X-axis direction) of the Coriolis frames on the left and right, the acceleration in the detecting direction (X-axis direction) can be extracted.

In the manner as described above, it is understood that according to the inertial sensor of the first embodiment, the angular rate, the acceleration in the detecting direction (X-axis direction) and the acceleration in the driving direction (Y-axis direction) can be detected at the same time by one inertial sensor. More particularly, the driving-direction acceleration detecting unit 8 connected between the plurality of mass members (drive frames) vibrating in opposite phases via the elastic body is provided, and thus the acceleration in the driving direction from the displacement amounts in the same phase of the plurality of mass members can be detected. Therefore, as well as the angular rate and the acceleration in the detecting direction for detecting the angular rate, the acceleration in the driving direction which generates a basic vibration for measuring the angular rate can be measured at the same time. Accordingly, since it is not necessary to separately provide an inertial sensor for measuring the angular rate and the acceleration in the detecting direction (X-axis direction) and an inertial sensor for measuring the acceleration in the driving direction (Y-axis direction), it is possible to obtain down-sizing of the inertial sensor.

Further, since it is possible to measure or distinguish the acceleration in the driving direction (Y-axis direction), a displacement error due to bias of the mass members occurring by the acceleration can be corrected, and a driving vibration which is strong against disturbance and always stable can be maintained, thereby improving the detection accuracy of the angular rate.

Figure 2:
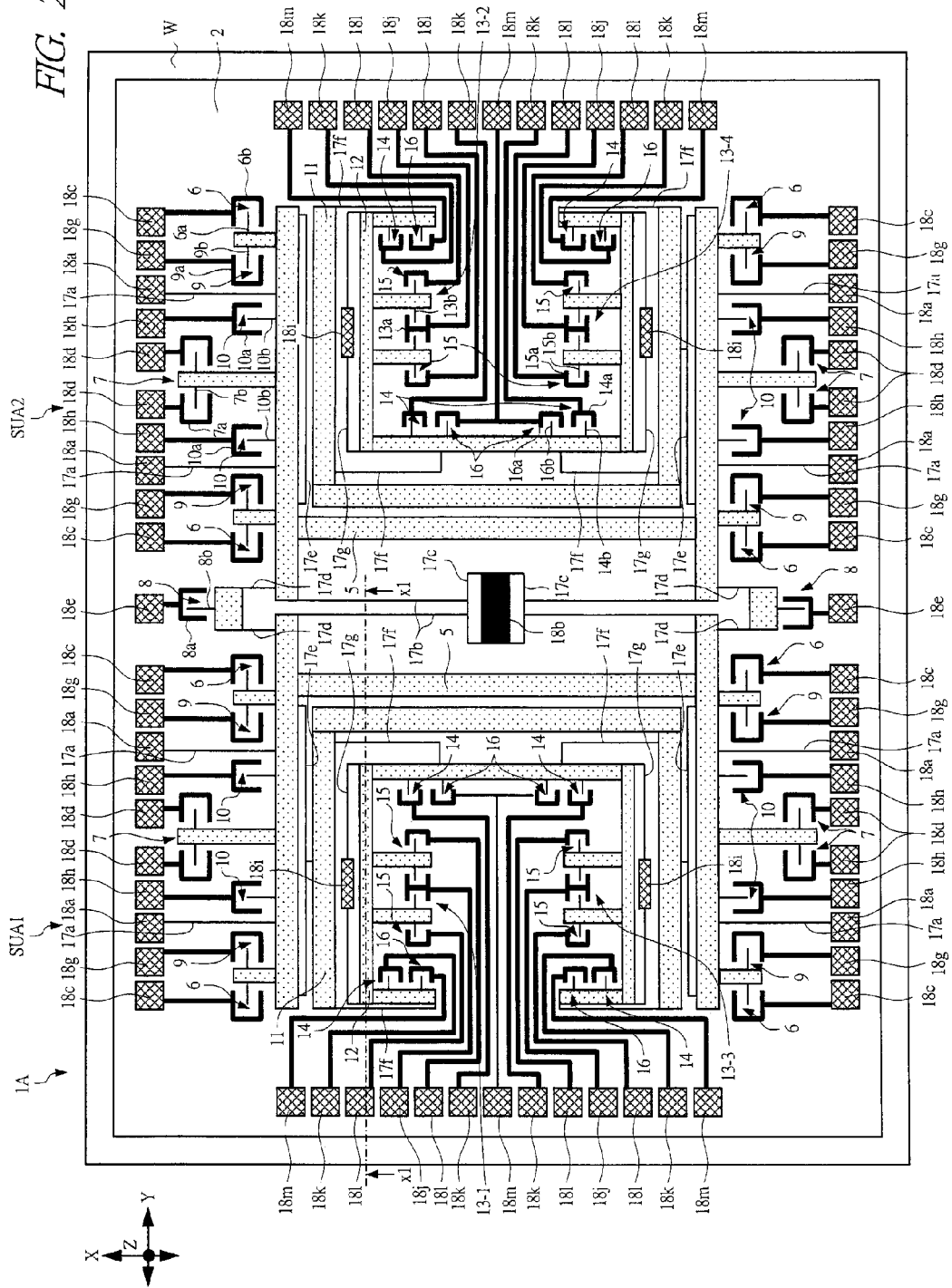
FIG. 2 is a planar view showing an example of an inertial sensor according to a first embodiment of the present invention.
Figure 3:
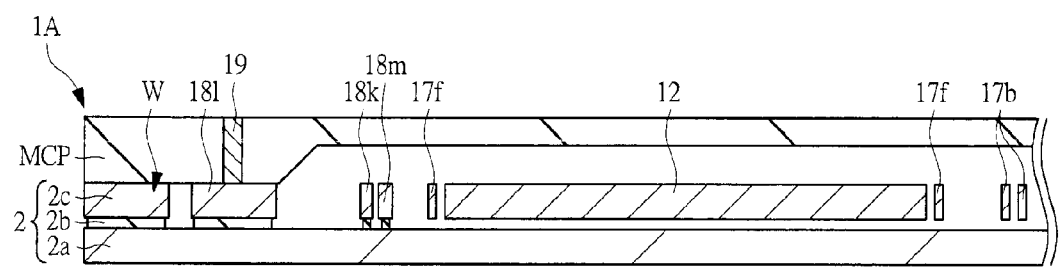
FIG. 3 is a cross-sectional view taken along the line x1-c1 in FIG. 2.

Next, an example of a configuration of the inertial sensor according to the first embodiment will be described with reference to the drawings. FIG. 2 is a planar view showing an example of the inertial sensor according to the first embodiment, and FIG. 3 shows a cross-sectional view taken along the line x1-x1 of FIG. 2. Note that, illustration of a molding cap is omitted in FIG. 2 to make the drawing easy to view. And, the Y-axis direction in FIG. 2 indicates a first direction, and the X-axis direction indicates a second direction orthogonal to the first direction (Y-axis direction).

As shown in FIG. 3, the basement layer 2 to compose an inertial sensor 1A comprises a first main surface (front surface) and a second main surface (back surface) which are positioned to opposite side in the thickness direction. The planar shape of the first main surface and the second main surface of the basement layer 2 is formed as, for example, a rectangular shape, and the area thereof is, for example, 12 mm$^2$. As the basement layer 2, for example, an SOI (Silicon On Insulator) substrate is used. That is, the basement layer 2 is made to have an active layer 2c formed on a supporting substrate 2a via an insulating layer 2b. The supporting substrate 2a is formed of, for example, silicon (Si), and the insulating layer 2b is formed of, for example, silicon oxide (SiO$_2$). And the active layer 2c is formed of, for example, conductive silicon. A combined thickness of the supporting substrate 2a and the insulating layer 2b is, for example, several tens to several hundreds of μm, and a thickness of the active layer 2c is, for example, several to several tens of μm. Note that, the basement layer 2 is not limited to an SOI substrate, and it can be variously modified. For example, conductive poly-silicon using a surface MEMS technology, or a plating metal such as nickel (Ni) can be used as the active layer 2c. As the basement layer 2, a semiconductor substrate made of normal single crystal silicon can be used.

Outer circumference of the first main surface of the basement layer 2 has an outer wall W formed thereto. The outer wall W is formed by a stacked layer of the insulating layer 2b and the active layer 2c formed on the insulating layer. And the area surrounded by the outer wall W of the first main surface of the basement layer 2 has two sensor units SUA1 and SUA2 formed therein (see FIG. 2). The two sensor units SUA1 and SUA2 are arranged next to each other being bilaterally symmetric on a first axis extending along the first direction (Y-axis direction) of the basement layer 2. In the first embodiment, the two sensor units SUA1 and SUA2 are vibrated in opposite phases to each other. That is, the two sensor units SUA1, SUA2 are vibrated in opposite phases in the first direction (Y-axis direction).

The respective sensor units SUA1 and SUA2 comprise, as shown in FIG. 2, a drive frame (mass member) 5, a driving means (driving member) 6, a driving-direction amplitude monitoring means 7, the driving-direction acceleration detecting unit 8, a driving-direction acceleration servo means 9, and a driving-direction resonance frequency tuning means 10. Further, a Coriolis frame 11, a detection frame 12, a detecting means (detecting member) 13 (13-1 to 13-4), an angular rate servo means 14, a detecting-direction acceleration servo means 15, a detecting-direction resonance frequency tuning means 16, and beams (elastic bodies) 17a to 17g are provided.

The drive frame 5 is formed by patterning the active layer 2c in a planar substantially frame shape. The drive frame 5 is arranged on the first main surface of the basement layer 2 in a state separated from the supporting substrate 2a as the insulating layer 2b thereunder is removed, that is, a floating state. And, the drive frame 5 is arranged so as to be displaced only in the driving direction (first direction, Y-axis direction) along the first main surface of the basement layer 2. The drive frame 5 is necessary to vibrate the Coriolis frame 11 in the driving direction (first direction, Y-axis direction) to be described later, and thus the drive frame 5 has only a rigidity not to let itself deformed, and the mass thereof is designed to be small so as to make the displacement amount in the detecting direction (second direction, X-axis direction) of the drive frame by the Coriolis force as small as possible. Such a drive frame 5 and the beams 17a integrally connected near four corners the outer circumference of the drive frame 5 are designed to work as a tuning fork together as respective vibration energies leak in, and connected to supports 18a and 18b via the arranged beams 17b and 17c.

The beams 17a, 17b, and 17c are formed by patterning the active layer 2c to be thinner than the pattern of the drive frame 5, and arranged on the first main surface of the basement layer 2 in a floating state similarly to the drive frame 5 as the insulating layer 2b thereunder is removed. The beams 17a and 17b are relatively long in the detecting direction (second direction, X-axis direction) in the planar shape, and relatively short in the driving direction (first direction, Y-axis direction), thereby having a function as a plate spring.

Note that, the beams 17a and 17b are composed to be flexible (soft) in the driving direction (first direction, Y-axis direction), and rigid (hard) in the detecting direction (second direction, X-axis direction) as compared with the rigidity in the driving direction (first direction, Y-axis direction), and the drive frame 5 is arranged to be vibrated only in the driving direction (first direction, Y-axis direction). One end of the beam 17b is connected to the drive frame 5, and another end is connected to the beam 17c.

The beam 17c is formed to be long in the driving direction (first direction, Y-axis direction), and the beam 17b is connected thereto. The beam 17c is displaced in the detecting direction (second direction, X-axis direction) as it is pulled by the beam 17b when the drive frames 5 are vibrated in opposite phases to each other. That is, the beam 17c works as a path through which the vibration energies of the drive frame 5 leaks, and as a result, the drive frames 5 can be vibrated stably with maintaining the opposite phases. In other words, a stable tuning-fork vibration is made.

The supports 18a are disposed at eight positions of the outer circumference of the drive frame 5. The support 18a is formed by a stacked pattern of the active layer 2c and the insulating layer 2b, and firmly joined and fixed to the supporting substrate 2a of the basement layer 2. Here, the support 18a has a function as an electrode for applying an electrical signal to the beam 17a and the drive frame 5 which are suspended objects.

Figure 4:
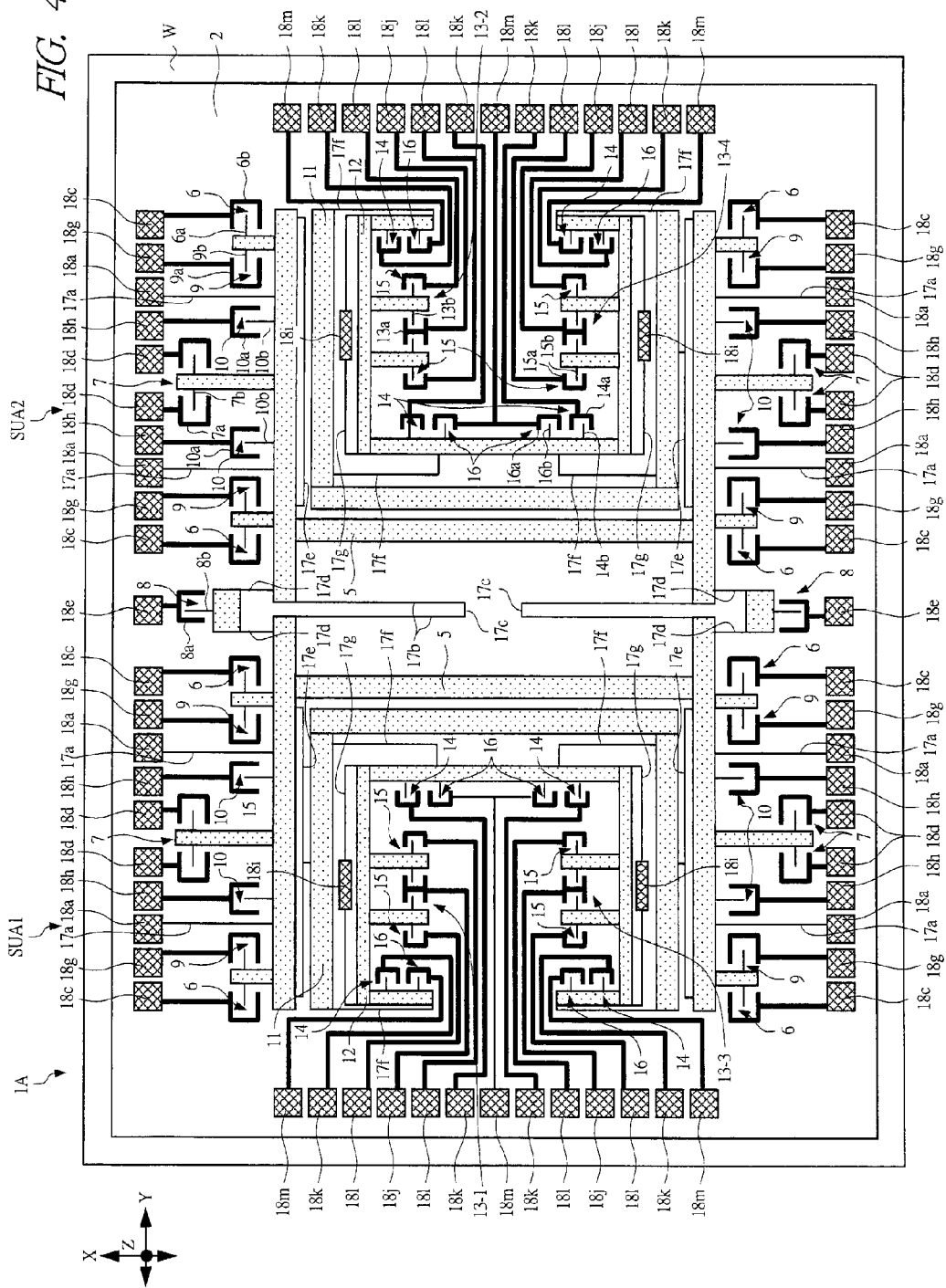
FIG. 4 is a planar view showing an example of an inertial sensor according to a modification example of the first embodiment.

The support 18b is arranged between the sensor units SUA1 and SUA2. The support 18b is formed by a stacked pattern of the active layer 2c and the insulating layer 2b, and firmly joined and fixed to the supporting substrate 2a of the basement layer 2. In this manner, the drive frame 5 of the sensor unit SUA1 and the drive frame 5 of the sensor unit SUA2 are connected to each other by the beams 17b and 17c, and the beams 17b and 17c are connected to the support 18b fixed to the basement layer 2. Here, while the support 18b is fixed to the basement layer 2 in the first embodiment, even when the support 18b is floated from the basement layer 2, the effect of the present invention can be obtained in principle. Further, even when the beam 17c working as a path for letting the vibration energies of the drive frames 5 to mutually leak in is composed to be a simple folded beam as shown in FIG. 4, the effect of the present invention can be obtained. As shown in FIG. 4, even when the beam 17b and the beam 17c are not fixed to the supports, same effect as that of the first embodiment can be obtained. In other words, the beam 17b and the beam 17c connecting the drive frames 5 of the sensor unit SUA1 and the sensor unit SUA2 may be fixed to the basement layer 2 via the support 18b and may not be fixed to the basement layer 2.

Next, the driving means 6 of the respective sensor units SUA1 and SUA2 are means for vibrating the drive frames 5 of respective sensor units SUA1 and SUA2 along the driving direction (first direction, Y-axis direction) in opposite phases to each other, and arranged near four corners of both side ends in the driving direction (first direction, Y-axis direction) of the drive frame. The driving means 6 is formed by an electrostatic comb-teeth driving device. In other words, the driving means 6 are alternately arranged along the detecting direction (second direction, X-axis direction) so that the plurality of movable electrodes 6a and the plurality of fixed electrodes 6b are engaged with each other.

The fixed electrode 6b of the driving means 6 is formed by patterning the active layer 2c. The fixed electrode 6b has the active layer 2c integrally formed with the active layer 2c of the support 18c, and is connected to the basement layer 2 being connected to the support 18c. The support 18c is disposed at outer circumference in the driving direction (first direction, Y-axis direction) of the drive frame 5. The support 18c is formed by a stacked pattern of the active layer 2c and the insulating layer 2b, and firmly joined and fixed to the supporting substrate of the basement layer 2. Here, the support 18c has a function as an electrode for applying an electrical signal to the fixed electrode 6b.

On the other hand, the movable electrode 6a of the driving means 6 is formed by patterning the active layer 2c. The insulating layer 2b under the movable electrode 6a is removed, and the movable electrode 6a is arranged in a floating state on the first main surface of the basement layer 2. And, the movable electrode 6a has the active layer 2c thereof integrally connected to the drive frame 5, so as to be displaced with the drive frame 5 as being connected to the drive frame 5. The driving means 6 in such a configuration is made to vibrate the drive frames 5 of the respective sensor units SUA1 and SUA2 in the driving direction (first direction, Y-axis direction) in opposite phases to each other by applying an AC driving signal with a DC bias voltage across the fixed electrode 6b and the movable electrode 6a to alternately generate electrostatic attractive force between the fixed electrode 6b and the movable electrode 6a.

Figure 5:
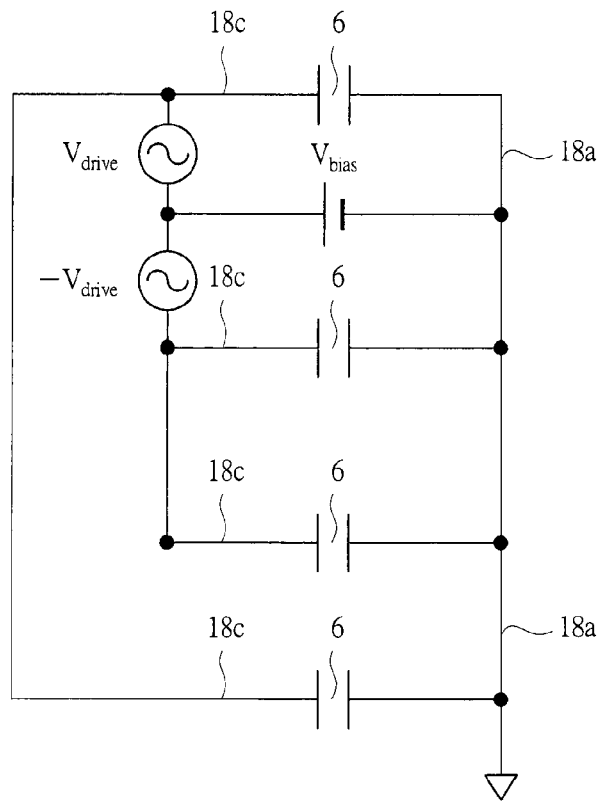
FIG. 5 is a circuit diagram showing a driving circuit of an inertial sensor.

FIG. 5 shows a driving circuit for driving such a driving means 6. Note that, in FIG. 5, the driving means 6 is denoted by a capacitor, and the supports 18a and 18c are denoted by wirings, and same symbols are applied as an equivalent circuit in this diagram. Further, the symbol $V_{bias}$ denotes a DC bias voltage to be applied to the driving means 6, and the symbol $V_{drive}$ is an AC driving signal to be applied to the driving means 6. By applying the AC driving signal appropriately, the drive frames 5 of the sensor units SUA1 and SUA2 can be vibrated in opposite phases to each other.

Here, since the drive frame 5 is vibrated only in the driving frame (first direction, Y-axis direction), the distance between the fixed electrode 6b and the movable electrode 6a of the driving means 6 can be made narrower than the case where a vibration coupling exists in the driving direction (first direction, Y-axis direction) and the detecting direction (second direction, X-axis direction) in principle. Therefore, according to the inertial sensor 1A of the first embodiment, utilization efficiency of the excitation energy can be improved.

The driving-direction amplitude detecting means 7 is means for monitoring a vibration state (for example, amplitude in the driving direction (first direction, Y-axis direction)) of the drive frame 5, and arranged near the centers of both side ends of the direction (second direction, X-axis direction) orthogonal to the driving direction (first direction, Y-axis direction) of the drive frame 5. The driving-direction amplitude monitoring means 7 is configured by alternately arranging the plurality of fixed electrodes 7a and the plurality of movable electrodes 7b along the direction (second direction, X-axis direction) orthogonal to the driving direction so that they are engaged with each other.

The driving-direction amplitude monitoring means 7 has a function of monitoring the vibration amplitude of the drive frame 5 in the driving direction (first direction, Y-axis direction). And, it has a role to maintain the driving amplitude in the driving direction constant based on the measurement result of the driving-direction amplitude monitoring means 7. That is, based on the amplitude measured by the driving-direction amplitude monitoring means 7, the vibration of the drive frame 5 by the driving means 6 described above is adjusted, and the measurement result is fed back to the driving-direction resonance frequency tuning means 10 described later, so that shifts in resonance is corrected.

The fixed electrode 7a of the driving-direction amplitude monitoring means 7 is formed by patterning the active layer 2c. The fixed electrode 7a is integrally formed with the active layer 2c of the support 18d, and fixed to the basement layer 2 as connected to the support 18d. The support 18d is formed by a stacked pattern of the active layer 2c and the insulating layer 2b, and firmly joined and fixed to the supporting substrate 2a of the basement layer 2. Here, the support 18d has a function as an electrode for applying an electrical signal to the fixed electrode 7a.

On the other hand, the movable electrode 7b of the driving-direction amplitude monitoring means 7 is formed by patterning the active layer 2c. The movable electrode 7b is arranged in a floating state from the first main surface of the basement layer 2 as the insulating layer 2b thereunder is removed. The movable electrode 7b is connected having its active layer 2c integrally formed with the active layer 2c of the drive frame 5, and connected to be fixed to the drive frame 5. The driving-direction amplitude monitoring means 7 in such a configuration monitors the vibration state of the drive frame 5 by detecting changes in electro-static capacitance between the oppositely facing surfaces of the fixed electrode 7a and the movable electrode 7b, and outputs a monitor signal thereof.

Figure 6:
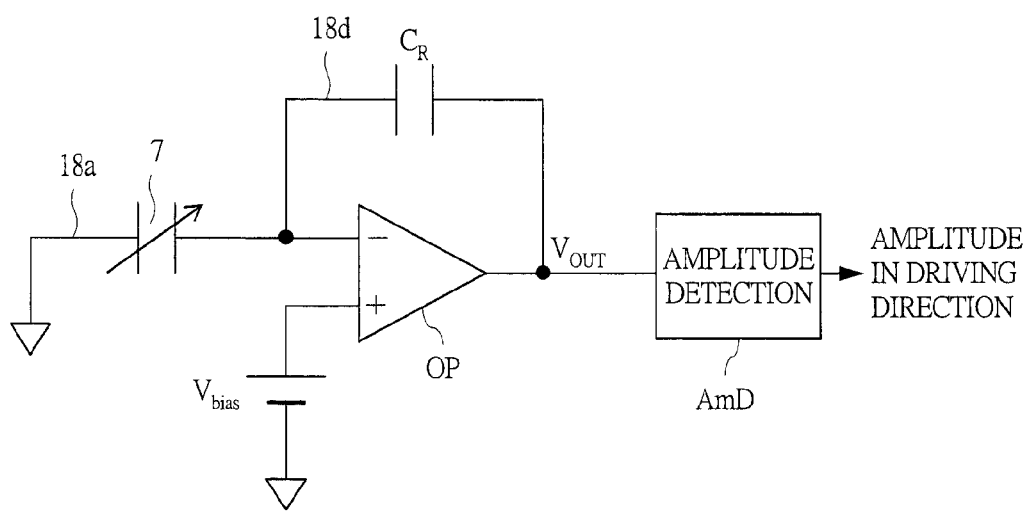
FIG. 6 is a circuit diagram showing an amplitude detecting circuit (monitor circuit) for a driving direction of the inertial sensor.

FIG. 6 shows a detecting circuit for detecting the monitor signal obtained by such a driving-direction amplitude monitoring means 7. Note that, in FIG. 6, the driving-direction amplitude monitoring means 7 is denoted by a capacitor, and the supports 18a and 18d are denoted by wirings, and same symbols are applied as an equivalent circuit in this diagram. Further, the symbol OP denotes an operational amplifier, the symbol AmD denotes an amplitude detecting circuit, the symbol $C_R$ denotes a reference capacitor, the symbol $V_{bias}$ denotes a bias voltage to be applied to the operational amplifier OP, and the symbol $V_{out}$ denotes an output voltage.

Here, it is assumed that the capacitance of the driving-direction amplitude monitoring means 7 is fluctuated by $\Delta C$ as the drive frame 5 is displaced in the driving direction (first direction, Y-axis direction). Since a voltage across the driving-direction amplitude monitoring means 7 is always being $V_{bias}$ by the operational amplifier OP, charges $\Delta Q=\Delta C\cdot V_{bias}$ is required to flow into the driving-direction amplitude monitoring means 7. Since the charges become equal to charges flowing out from the reference capacitor $C_R$, a voltage of the reference capacitor $C_R$ is fluctuated by $(\Delta C/C_R)V_{bias}$. Therefore, the output voltage $V_{out}$ becomes $V_{out}=(1+\Delta C/C_R)V_{bias}$. An output result thereof is fed back to the driving means 6 that vibrates the drive frame 5 and the driving-direction resonance frequency tuning means 10, and thus a stable driving-direction vibration can be obtained.

Further, signals from the driving-direction amplitude monitoring means 7 of the respective sensor units SUA1 and SUA2 are subjected to an arithmetic processing, and thus the acceleration in the driving direction (first direction, Y-axis direction) can be detected. For example, by taking a difference between a sum of capacitance change values of the driving-direction amplitude monitoring means 7 arranged in the positive (+) direction of the driving direction and a sum of capacitance change values of the driving-direction amplitude monitoring means 7 arranged in the negative (−) direction of the driving direction of the respective sensor units SUA1 and SUA2, a capacitance change by the opposite-phase vibrations of the drive frame 5 is cancelled, and an output proportional to the same-phase vibration (acceleration) applied in the driving direction can be obtained.

However, this method is required to enlarge the size of the electrodes for obtaining capacitance changes adequate for detecting acceleration in the case of the comb-teeth electrodes having the fixed electrode 7a and the movable electrode 7b provided in parallel in the driving direction (first direction, Y-axis direction). Further, with regards to a parallel plate electrodes having the fixed electrode 7a and the movable electrode 7b provided perpendicular to the driving direction (first direction, Y-axis direction), the distance between the fixed electrode 7a and the movable electrode 7b is required to be larger than or equal to the amplitude of the opposite-phase vibration of the drive frame 5, and electrodes smaller than the comb-teeth electrodes described above but having larger size is required for obtaining capacitance change adequate for detecting the acceleration. Moreover, the parallel plate electrodes requires a higher driving voltage as compared with the comb-teeth electrodes for obtaining a necessary amplitude because a viscosity of a viscose fluid (air) between the movable electrode 7b and the fixed electrode 7a disturbs the vibration in opposite phases of the drive frame 5.

Next, the driving-direction acceleration detecting unit 8 is for detecting the acceleration applied in the driving direction, and arranged between the drive frames 5 as being connected with the drive frame 5 via the elastic body 17d. The driving-direction acceleration detecting unit 8 has a configuration where the plurality of fixed electrodes 8a and the plurality of movable electrodes 8b are arranged along the driving direction (first direction, Y-axis direction) so as to be engaged with each other.

The fixed electrode 8a of the driving-direction acceleration detecting unit 8 is formed by patterning the active layer 2c. The fixed electrode 8a is integrally formed with the active layer 2c of a support 18e and fixed to the basement layer 2 as being connected to the support 18e. The support 18e is formed by a stacked pattern of the active layer 2c and the insulating layer 2b, and firmly joined and fixed to the supporting substrate 2a of the basement layer 2. Here, the support 18e has a function as an electrode for applying an electrical signal to the fixed electrode 8a.

On the other hand, the movable electrode 8b of the driving-direction acceleration detecting unit 8 is formed by patterning the active layer 2c. The movable electrode 8b is arranged in a floating state from above the first main surface of the basement layer 2 as the insulating layer 2b thereunder is removed. The movable electrode 8b is connected to the active layer 2c of the drive frame 5 via the beam 17d which is flexible in the driving direction (first direction, Y-axis direction). Such a driving-direction acceleration detecting unit 8 is not displaced when the drive frames 5 are vibrated in opposite phases with a same amplitude, and is displaced when the drive frames 5 are vibrated in the same phase by the acceleration applied in the driving direction (first direction, Y-axis direction) as following the movement thereof. This vibration state is detected by capacitance changes between the facing surfaces of the fixed electrode 8a and the movable electrode 8b, and a detected signal thereof is outputted as the acceleration in the driving direction. The movable electrode 8b is only necessary to have a rigidity not to let the movable electrode 8b itself deformed, and a mass thereof is designed to be small for making a phase delay of acceleration response due to the inertial force of the movable electrode 8b itself as small as possible.

One feature of the inertial sensor 1A according to the first embodiment is that the driving-direction acceleration detecting unit 8 is connected to the drive frames 5 that vibrate in the driving direction (first direction, Y-axis direction) in opposite phases via the beam 17d. By providing the driving-direction acceleration detecting unit 8 in this manner, the acceleration in the driving direction can be detected while the drive frames 5 are vibrated in opposite phases. In other words, when the acceleration is not applied in the driving direction (first direction, Y-axis direction), vibrations in mutually opposite phases are applied to the driving-direction acceleration detecting unit 8 from the drive frames on the left and right, so that the vibrations are negated, and thus the distance of the capacitive element composing the driving-direction acceleration detecting unit 8 is not changed. Therefore, the acceleration in the driving direction (first direction, Y-axis direction) is not detected by the driving-direction acceleration detecting unit 8. On the other hand, when the acceleration is applied in the driving direction (first direction, Y-axis direction), the drive frames 5 on the left and right are displaced in the same phase. Therefore, since the drive frames 5 on the left and right are vibrated in the same phase, the driving-direction acceleration detecting unit 8 connected to the drive frames 5 on the left and right is displaced. Accordingly, the distance of the capacitive element composing the driving-direction acceleration detecting unit 8 is changed, and the capacitance of the capacitive element is changed. By detecting the capacitance change, the acceleration in the driving direction can be detected. In this manner, according to the first embodiment, it is understood that a feature lies in that the driving-direction acceleration detecting unit 8 is provided as focusing on the facts that the drive frames 5 on the left and right are displaced in the same phase by an acceleration in the driving direction and that displacement amounts in the same phase in the driving direction does not occur when an acceleration in the driving direction is not applied even the driving-direction acceleration detecting unit 8 is connected to the drive frames 5 being vibrated in mutually opposite phases.

Subsequently, a further advantage of the driving-direction acceleration detecting unit 8 provided to the inertial sensor according to the first embodiment will be described. There is a relationship expressed by Equation 5 between a displacement amount in the driving direction (first direction, Y-axis direction) and an acceleration in the driving direction (first direction, Y-axis direction).

$$y=ma/k_{drive} \quad \text{Equation 5}$$

Where: y: displacement amount in driving direction (first direction, Y-axis direction), a: acceleration applied in driving direction (first direction, Y-axis direction), $k_{drive}$: spring constant in driving direction (first direction, Y-axis direction), m: total mass of drive frame 5, Coriolis frame 11 disposed in the drive frame 5, and movable electrode 8b of driving-direction acceleration detecting unit 8.

Further, $k_{drive}$ satisfies a relationship expressed by Equation 6.

$$k_{drive} = (Ebh^3/L^3) \qquad \text{Equation 6}$$

Where: E: longitudinal elastic modulus of beam, b: thickness of beam (thickness of the active layer 2c), h: width of beam, L: length of beam.

From Equation 5 and Equation 6 described above, to measure the acceleration "a" applied in the driving direction (first direction, Y-axis direction) with a high accuracy, it is necessary to make the mass "m" large and the spring constant $k_{drive}$ small.

Figure 7:
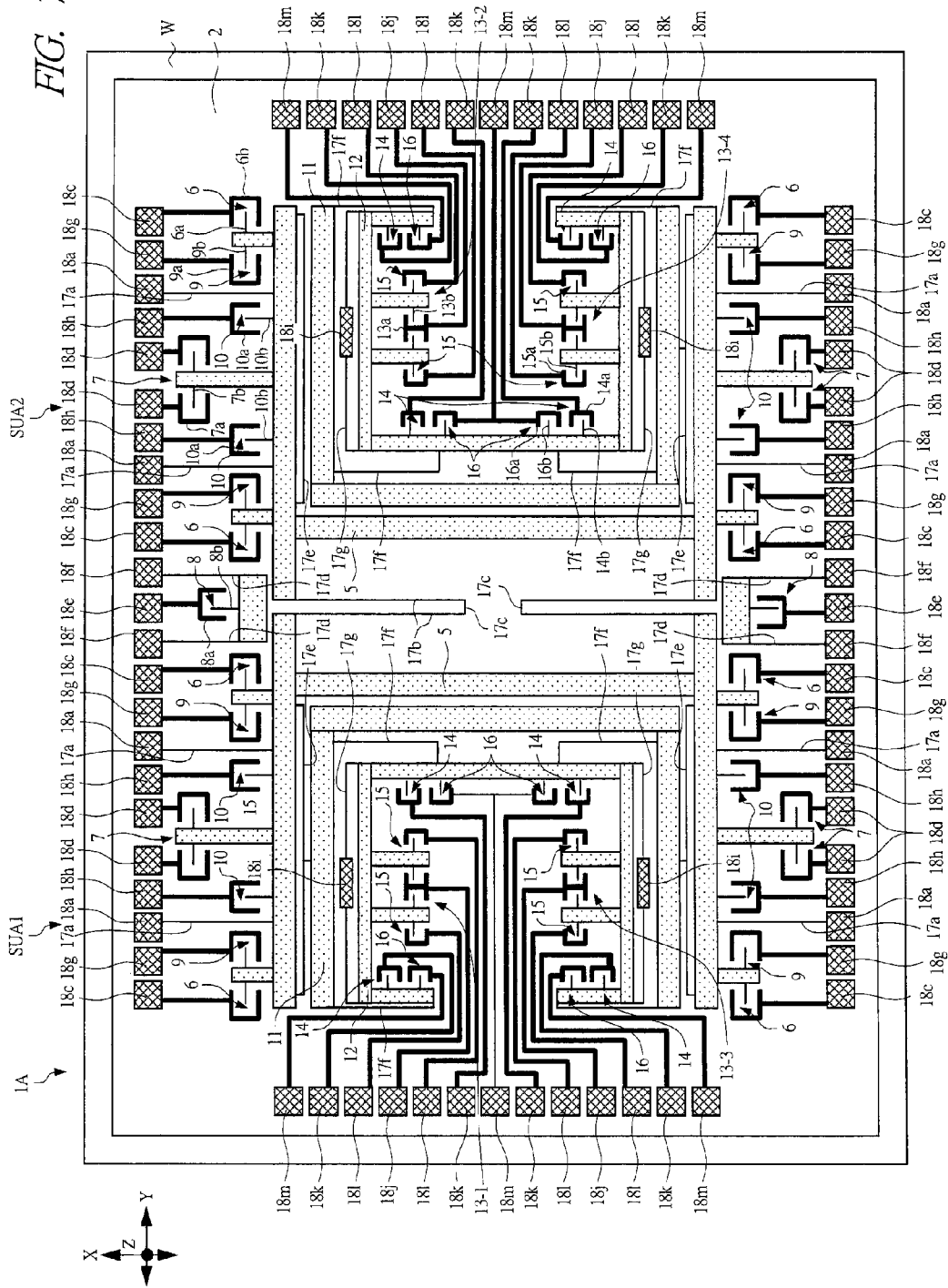
FIG. 7 is a planar view showing an example of an inertial sensor on which the inventors of the present invention have studied.

For example, as shown in FIG. 7, to measure the acceleration in the driving direction (first direction, Y-axis direction), it is assumed that the small driving-direction acceleration detecting unit 8 is not connected to the drive frames 5 but is connected to a support 18f via the beam 17d to be fixed to the basement layer 2. In this case, the value of "m" shown in Equation 5 is a mass of only the movable electrode 8b of the driving-direction acceleration detecting unit 8. Since the mass of only the movable electrode 8b is too small, there is only a way of making the spring constant $k_{drive}$ small to obtain a necessary sensitivity. However, from Equation 6, to make the spring constant $k_{drive}$ small, the width of the beam 17d is necessary to be smaller or the length of the beam 17d is necessary to be larger. Meanwhile, there is a limitation in narrowing the width of the beam 17d in accordance with restrictions in processing. In addition, it becomes vulnerable due to shock from outside when narrowing the width of the beam 17d. Further, it is not preferable to make the length of the beam 17d longer in view of down-sizing. As just described, it is difficult to achieve both sensitivity and strength when only providing the driving-direction acceleration detecting unit 8 simply.

Accordingly, in the first embodiment, as shown in FIG. 2, the driving-direction acceleration detecting unit 8 is connected to the drive frame 5 by the beam 17d. In this case, in the driving-direction acceleration detecting unit 8, mass of the driving frame 5 and that of the Coriolis frame 11 are included other than that of the movable electrode 8b as the "m" in Equation 5, and thus the mass can be enlarged. In other words, since the mass can be enlarged, the detection sensitivity of acceleration in the driving direction (first direction, Y-axis direction) can be improved. Further, since an adequate detection sensitivity can be obtained by enlarging the mass, it is not necessary to make the spring constant $k_{drive}$ small. Consequently, the strength of the beam can be maintained. Moreover, there are less restrictions in processing the beam 17d, and it is an advantage in down-sizing. As described above, according to the inertial sensor of the first embodiment, as well as being possible to detect the acceleration in the driving direction (first direction, Y-axis direction) with a good sensitivity, the strength of the beam can be maintained. In addition, down-sizing of the inertial sensor 1A to which the driving-direction acceleration detecting unit 8 is formed can be achieved.

Note that, the driving-direction acceleration detecting unit 8 is not limited to be connected to the drive frames 5 vibrating in opposite phases, and same effects as those in the case of connecting to the drive frames 5 vibrating in opposite phases can be obtained when the driving-direction acceleration detecting unit 8 is connected to a structure vibrating in opposite phases in the driving direction (first direction, Y-axis direction) such as the beam 17b.

Figure 8:
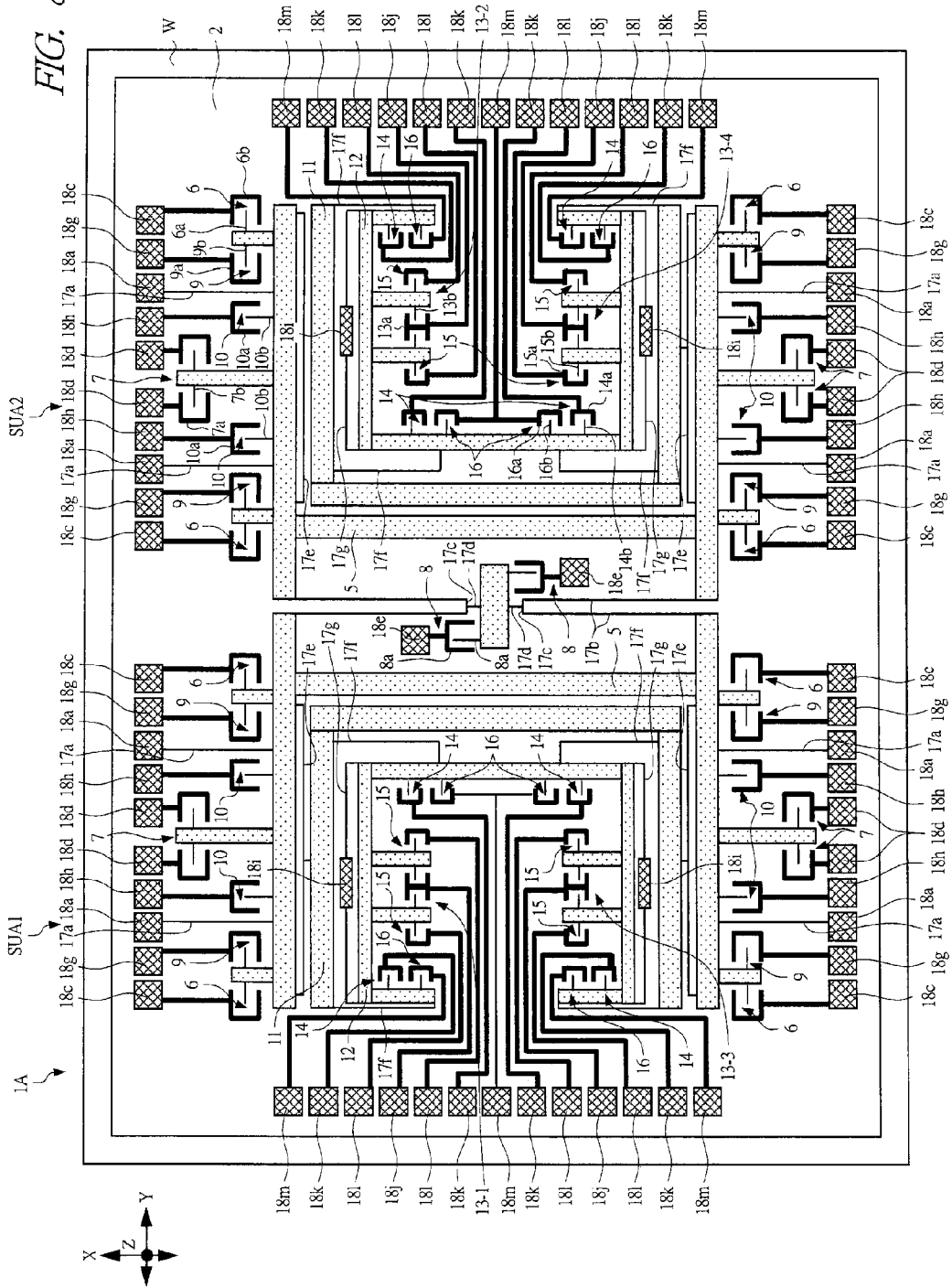
FIG. 8 is a planar view showing an example of an inertial sensor according to a modification example of the first embodiment.

In addition, other than the part vibrating in opposite phases in the driving direction (first direction, Y-axis direction), as shown in FIG. 8, when the driving-direction acceleration detecting unit 8 is connected to a part to be a joint of the opposite-phase vibration of the drive frames 5, for example, a part between the beams 17c and 17c directly or via the beam 17d, same effects can be obtained. That is, when the connection between the drive frames 5 vibrating in opposite phases is made by the beams 17b and 17c as shown in FIG. 8, there is a joint where no vibration is made on the beam 17b and the beam 17c. This joint is not displaced when an acceleration is not applied in the driving direction (first direction, Y-axis direction). On the other hand, when an acceleration is applied in the driving direction (first direction, Y-axis direction), the position of the joint is also changed. Therefore, by providing the driving-direction acceleration detecting unit 8 at the position of the joint, the acceleration in the driving direction (first direction, Y-axis direction) can be detected similarly to the case where the driving-direction acceleration detecting unit 8 is connected to the drive frames 5 vibrating in mutually opposite phases.

Further, by arranging the driving-direction acceleration detecting unit 8 at the part to be a joint, the distance between the fixed electrode 8a and the movable electrode 8b of the driving-direction acceleration detecting unit 8 can be made narrower than a opposite-phase amplitude of the drive frames 5, thereby enabling a high-sensitivity measurement by further smaller electrodes than the method of detecting the acceleration in the driving direction by using the driving-direction amplitude monitoring means 7.

Still further, by arranging the driving-direction acceleration detecting unit 8 at a position to be a joint, even when the fixed electrode 8a and the movable electrode 8b of the driving-direction acceleration detecting unit 8 are in the parallel plate type by providing them orthogonal to the driving direction (first direction, Y-axis direction), the viscosity of the viscous fluid between the fixed electrode 8a and the movable electrode 8b does not disturb the opposite-phase vibration of the drive frames 5. Therefore, by providing the driving-direction acceleration detecting unit 8, the opposite-phase amplitudes are not influenced without excitation energy loss.

Figure 9:
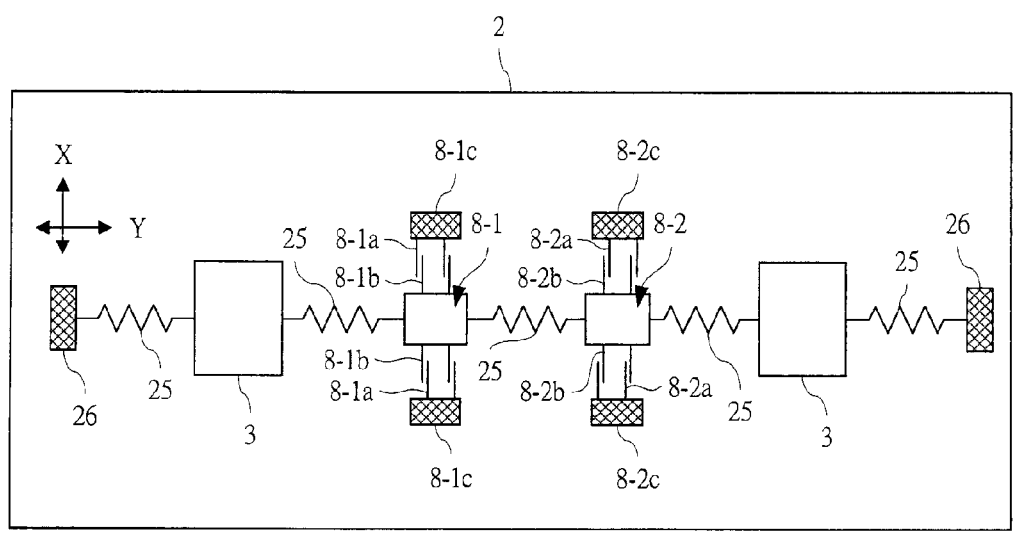
FIG. 9 is a diagram showing a basic configuration of an inertial sensor in which a plurality of driving-direction acceleration detecting units are provided.

Moreover, the number of the driving-direction acceleration detecting unit 8 is not necessary to be one, and it may be more than one, as shown in FIG. 9. In this case, the acceleration can be detected by comparing capacitance changes of the respective driving-direction acceleration detecting units 8-1 and 8-2 and taking the difference therebetween. In other words, as shown in FIG. 9, pluralities of the driving-direction acceleration detecting units 8-1 and 8-2 may be provided between the drive frames 5 on the left and right. In this case, the driving-direction acceleration detecting unit 8-1 on the left has a movable electrode 8-1b and a fixed electrode 8-1a fixed to a fixing member 8-1c. Similarly, the driving-direction acceleration detecting unit 8-2 on the right has a movable electrode 8-2b and a fixed electrode 8-2a fixed to a fixing member 8-2c.

Next, the driving-direction acceleration servo means 9 is means for active control by generating a rebalancing force corresponding to a detected displacement amount (displacements in same phase) by an acceleration detected by the driving-direction acceleration detecting unit 8 so as to make the amplitudes by the acceleration applied to the drive frames 5 to be always zero, and arranged to face opposed to the driving means 6. The driving-direction acceleration servo means 9 is configured by a plurality of fixed electrodes 9a and a plurality of movable electrode 9b which are alternately arranged along the detecting direction (second direction, X-axis direction) so as to engage with each other. And, the rebalancing force is generated by applying a bias voltage across the plurality of fixed electrodes 9a and the plurality of movable electrodes 9b of the driving-direction acceleration servo means 9. Therefore, the applied acceleration can be measured by outputting the bias voltage itself.

The driving-direction acceleration detecting unit 8 includes the capacitive element configured by the fixed electrode 8a and the movable electrode 8b, and the distance between the fixed electrode 8a and the movable electrode 8b is made to be changed when an acceleration in the driving direction (first direction, Y-axis direction) is generated. And, it is configured that the acceleration in the driving direction (first direction, Y-axis direction) is detected by utilizing the fact that the capacitance of the capacitive element is changed in accordance with the distance between the fixed electrode 8a and the movable electrode 8b. More specifically, when an acceleration in the driving direction (first direction, Y-axis direction) is generated, the movable electrode 8b of the driving-direction acceleration detecting unit 8 is displaced, thereby detecting the acceleration in the driving direction (first direction, Y-axis direction). As the acceleration in the driving direction (first direction, Y-axis direction) becomes larger, the displacement amount of the movable electrode 8b becomes larger. While the movable electrode 8b is connected to a beam and displaced in accordance with a displacement amount of the beam, as the acceleration in the driving direction (first direction, Y-axis direction) is made larger, the displacement amount of the beam connected to the movable electrode is made larger. Although the linearity of the displacement amount of the beam is maintained while the acceleration in the driving direction (first direction, Y-axis direction) is small, the linearity of the displacement amount of the beam becomes difficult to be maintained when the acceleration in the driving direction (first direction, Y-axis direction) becomes large, and thus the detection sensitivity of the acceleration in the driving direction (first direction, Y-axis direction) is changed. Further, when trying to take a dynamic range capable of detecting the acceleration in the driving direction (first direction, Y-axis direction) wide, it is necessary to make the distance between the movable electrode 8b and the fixed electrode 8a large enough not to make the movable electrode 8b contact with the fixed electrode 8a even when a large acceleration is applied. The smaller the distance between the movable electrode 8b and the fixed electrode 8a, the more detection sensitivity of acceleration is improved, and thus the detection sensitivity of the acceleration is lowered when the distance between the movable electrode 8b and the fixed electrode 8a is widened.

Accordingly, the driving-direction acceleration servo means 9 is provided in the first embodiment. The driving-direction acceleration servo means 9 generates a rebalancing force so as to make the displacement amount of the movable electrode 8b of the driving-direction acceleration detecting unit 8 zero based on the detection result of the driving-direction acceleration detecting unit 8. More particularly, the driving-direction acceleration servo means 9 forcibly eliminates the displacement amount of the movable electrode 8b of the driving-direction acceleration detecting unit 8 by the rebalancing force. In other words, an acceleration in the driving direction (first direction, Y-axis direction) is detected by the driving-direction acceleration servo means 9 by indirectly taking the displacement amount of the movable electrode 8b as a magnitude of the rebalancing force. Since the rebalancing force for cancelling out the displacement amount of the movable electrode 8b is changed in accordance with the displacement amount of the movable electrode 8b, it is possible to detect how much acceleration is applied in the driving direction (first direction, Y-axis direction) by measuring the rebalancing force.

The following effects can be obtained by providing the driving-direction acceleration servo means 9. That is, since the displacement amount of the movable electrode 8b is not generated by the rebalancing force even when an acceleration in the driving direction (first direction, Y-axis direction) is applied, the beam connected to the movable electrode 8b is not strained. Therefore, the linearity of the beam is good and the acceleration can be stably detected. And, since the displacement amount of the movable electrode 8b is not generated, the distance between the fixed electrode 8a and the movable electrode 8b can be made narrow. That is, even when the distance between the fixed electrode 8a and the movable electrode 8b is narrow, these electrodes are prevented from contacting with each other when a large acceleration is applied. Therefore, it becomes possible to narrow the distance between the fixed electrode 8a and the movable electrode 8b, thereby improving the detection sensitivity of acceleration. On the other hand, the detection range (dynamic range) of acceleration can be ensured. Note that, while the driving-direction acceleration servo means 9 is provided in the first embodiment, it may not be provided. That is, the acceleration may be detected directly from the displacement amount of the movable electrode 8b of the driving-direction acceleration detecting unit 8.

The fixed electrode 9a of the driving-direction acceleration servo means 9 is formed by patterning the active layer 2c. The fixed electrode 9a has the active layer 2c thereof integrally formed with the active layer 2c of the support 18g, thereby being connected to the support 18g to be fixed to the basement layer 2. The support 18g is arranged outside the drive frames 5 and inside the outer wall W in view of pull-put of wirings after cap (MCP) molding. The support 18g is formed by a stacked pattern of the active layer 2c and the insulating layer 2b, and firmly joined and fixed by the supporting substrate 2a of the basement layer 2. Here, the support 18g has functions as an electrode for applying an electrical signal to the fixed electrode 9a and as a wiring inside of the sensor unit.

On the other hand, the movable electrode 9b of the driving-direction acceleration servo means 9 is formed by patterning the active layer 2c. The movable electrode 9b is arranged in a floating state above the first main surface of the basement layer 2 as the insulating layer 2b thereunder is removed. The movable electrode 9b has the active layer 2c thereof integrally formed with the active layer 2c of the drive frame 5, thereby being connected to the drive frames 5.

Next, the driving-direction resonance frequency tuning means 10 is for active control of variations in resonance frequencies of the drive frames 5 generated by changes in peripheral temperature and vacuum or variations in processing, and arranged outside of an end surface in the detecting direction (second direction, X-axis direction) of the drive frames 5. The driving-direction resonance frequency tuning means 10 is configured by a plurality of fixed electrodes 10a and a plurality of movable electrodes 10b which are alternately arranged along the driving direction (first direction, Y-axis direction) so as to engage with each other.

While the drive frames 5 are configured so as to be vibrated in the driving direction (first direction, Y-axis direction) by the driving means 6, it is necessary to vibrate the drive frames 5 at a resonance point so as to maintain the vibration stably. However, when the peripheral temperature of the inertial sensor 1A is changed, the vibration of the drive frames is shifted from the resonance point. When the vibration of the drive frames 5 is shifted from the resonance point, the amplitude of the vibration becomes smaller abruptly, and thus it is difficult to stably maintain the vibration. Accordingly, the driving-direction resonance frequency tuning means 10 is provided in the inertial sensor 1A according to the first embodiment. According to the driving-direction resonance frequency tuning means 10, when the vibration is shifted from the resonance point, the driving-direction resonance frequency tuning means 10 corrects the shift so that the vibration of the drive frames 5 is adjusted to be made at the resonance point. Therefore, the vibration of the drive frames 5 in the driving direction (first direction, Y-axis direction) can be stably maintained.

The fixed electrode 10a of the driving-direction resonance frequency tuning means 10 is formed by patterning the active layer 2c. The fixed electrode 10a has the active layer 2c thereof integrally formed with the active layer 2c of the support 18h, thereby being connected to the support 18h to be fixed to the basement layer 2. The support 18h is formed by a stacked pattern of the active layer 2c and the insulating layer 2b, and firmly joined and fixed to the supporting substrate 2a of the basement layer 2. Here, the support 18h has a function as an electrode for applying an electrical signal to the fixed electrode 10a.

On the other hand, the movable electrode 10b of the driving-direction resonance frequency tuning means 10 is formed by patterning the active layer 2c. The movable electrode 10b is arranged in a floating state above the first main surface of the basement layer 2 as the insulating layer 2b under the movable electrode 10b is removed. The movable electrode 10b has the active layer 2c thereof integrally formed with the active layer 2c of the drive frame 5, thereby being connected to the drive frames 5.

Subsequently, inside the drive frame 5, the Coriolis frame 11 is arranged. The Coriolis frame 11 is formed by patterning the active layer 2c in a planar substantially frame shape. The Coriolis frame 11 is also arranged in a floating state above the first main surface of the basement layer 2 as the insulating layer 2b thereunder is removed. The Coriolis frame 11 is designed to be displaced in both the driving direction (first direction, Y-axis direction) and the detecting direction (second direction, X-axis direction). And, the Coriolis frame 11 also is vibrated along the first main surface of the basement layer 2. Such a Coriolis frame 11 is connected to the drive frames 5 via a beam 17e. In this manner, the Coriolis frame 11 is vibrated in the driving direction (first direction, Y-axis direction) with the same amplitude and in the same phase with the drive frames 5. And, the Coriolis frame 11 is displaced in the detecting direction (second direction, X-axis direction) by the Coriolis force when an angular rate about the Z axis is applied. That is, the mass of the Coriolis frame 11 becomes the "m" in Equation 1. Therefore, the Coriolis frame 11 is designed to have a large mass to achieve a high sensitivity.

The Coriolis frame 11 is arranged inside each of the drive frames 5 on the left and right, and the respective Coriolis frames 11 is vibrated in the driving direction (first direction, Y-axis direction) in mutually opposite phases similarly to the drive frames 5 on the left and right. Therefore, the Coriolis frames 11 on the left and right are displaced in the detecting direction (second direction, X-axis direction) by the Coriolis force when an angular rate about the Z axis is applied. Since the Coriolis frames 11 on the left and right are vibrated in the driving direction (first direction, Y-axis direction) in opposite phases with each other, the displacement amounts in the detecting direction (second direction, X-axis direction) by the Coriolis force are in opposite phases.

The beam 17e is formed by patterning the active layer 2c to be thinner than the pattern of the Coriolis frame 11 (that is, the beam 17e is integrally formed with the active layer 2c of the drive frame 5 and the Coriolis frame 11), and arranged in a floating state above the first main surface of the basement layer 2 as the insulating layer 2b is removed, similarly to the Coriolis frame 11. The beam 17e has a relatively long part extending in the driving direction (first direction, Y-axis direction) and a relatively short part extending in the detecting direction (second direction, X-axis direction) perpendicular to the driving direction. Both ends of the relatively long part are connected to an inner circumference of the drive frame 5. And, one end of the relatively short part is connected to the center in the longitudinal direction of the relatively long part, and the other end is connected to the center on the edge side of the Coriolis frame 11 in the detecting direction (second direction, X-axis direction). The beam 17e also has a function as a plate spring. Note that, the beam 17e is formed to be rigid in the driving direction (first direction, Y-axis direction) and flexible in the detecting direction (second direction, X-axis direction) as compared with the rigidity in the driving direction (first direction, Y-axis direction). Therefore, the vibration of the drive frames 5 in the driving direction (first direction, Y-axis direction) is transferred to the Coriolis frame 11 as it is, and the vibration of the Coriolis frames 11 in the detecting direction (second direction, X-axis direction) is absorbed so as not to be transferred to the drive frame 5.

The detection frame 12 is arranged inside the Coriolis frame 11 as described above. The detection frame 12 is formed by patterning the active layer 2c in a planar substantially frame shape. The detection frame 12 is also arranged in a floating state above the first main surface of the basement layer 2 as the insulating layer 2b thereunder is removed. The detection frame 12 is connected to the Coriolis frame 11 via the beam 17f, and fixed to the basement layer 2 being connected to the support 18i via the beam 17g. In this manner, the detection frame 12 is vibrated with a same amplitude and in a same phase with the vibration of the Coriolis frame 11 in the detecting direction (second direction, X-axis direction). And, the detection frame 12 is also vibrated along the first main surface of the basement layer 2.

The beam 17f is formed by patterning the active layer 2c to be thinner than the pattern of the Coriolis frame 11 and the detection frame 12 (that is, the beam 17f is integrally formed with the active layer 2c of the drive frame 5 and the Coriolis frame 11), and arranged in a floating state above the first main surface of the basement layer 2 as the insulating layer 2b thereunder is removed, similarly to the drive frame 5 and the like.

The beam 17f has a relatively long part being extending linearly in the detecting direction (second direction, X-axis direction) and a relatively short part being extending linearly in the driving direction (first direction, Y-axis direction) perpendicular to the detecting direction. Both ends of the relatively long part of the beam 17f are connected to the inner circumference of the Coriolis frame 11. And, one end of the relatively short part of the beam 17f is connected to the center in the longitudinal direction of the relatively long part, and the other end is connected to an edge side in the driving direction (first direction, Y-axis direction) of the detection frame 12. The beam 17f also has a function as a plate spring. Note that, the beam 17f is formed to be flexible in the driving direction (first direction, Y-axis direction) and rigid in the detecting direction (second direction, X-axis direction) as compared with the rigidity in the driving direction (first direction, Y-axis direction). Therefore, the vibration of the Coriolis frame 11 in the detecting direction (second direction, X-axis direction) is transferred to the detection frame 12 as it is, and the vibration in the driving direction (first direction, Y-axis direction) is absorbed. More particularly, the detection frame 12 is displaced only in the detecting direction (second direction, X-axis direction).

In addition, the beam 17g has a relatively long part extending linearly in the driving direction (first direction, Y-axis direction) and a relatively short part extending linearly in the detecting direction (second direction, X-axis direction) perpendicular to the driving direction. Both ends of the relatively short part of the beam 17g is connected to the outer circumference of the detection frame 12. And, one end of the relatively longer part of the beam 17g is connected to one end in the longitudinal direction of the relatively short part, and the other end is connected to the support 18i near the center in the detecting direction (second direction, X-axis direction) of the detection frame 12. The beam 17g also has a function as a plate spring. Note that, the beam 17g is formed to be flexible in the detecting direction (second direction, X-axis direction) and rigid in the driving direction (first direction, Y-axis direction) as compared with the rigidity in the detecting direction (second direction, X-axis direction). Therefore, the vibration of the Coriolis frame 11 in the detecting direction (second direction, X-axis direction) is transferred to the detection frame 12 as it is, and the vibration in the driving direction (first direction, Y-axis direction) is absorbed by the beam 17g. Consequently, the detection frame 12 is only necessary to have a rigidity not to deform the detection frame 12 itself, and it is designed to have a small mass to improve the detection sensitivity and to prevent generation of unnecessary signals.

Next, the detecting means 13-1 to 13-4 are arranged inside the detection frame 12. The detecting means 13-1 to 13-4 are formed by a comb-teeth detecting device. That is, the detecting means 13-1 to 13-4 are configured by a plurality of fixed electrodes 13a and a plurality of movable electrodes 13b alternately arranged along the detecting direction (second direction, X-axis direction) so as to engage with each other. The detecting means 13-1 to 13-4 detect a displacement amount as a change in capacitance between detecting electrodes (between the fixed electrode 13a and movable electrode 13b) when the detection frame 12 is displaced in the detecting direction (second direction, X-axis direction) by an acceleration or an angular rate. In other words, changes in the capacitance that is changed as the fixed electrode 13a and the movable electrode 13b come close to and far from each other in accordance with the displacement amount of the detection frame in the detecting direction (second direction, X-axis direction).

The fixed electrode 13a of the detecting means 13-1 to 13-4 is formed by patterning the active layer 2c. The fixed electrode 13a has the active layer 2 being integrally formed with the active layer 2c of the support 18j, and fixed to the basement layer 2 as being connected to the support 18j. The support 18j is arranged at the outer circumference of the respective sensor units SUA1 and SUA2. The support 18j is formed by patterning the active layer 2c and the insulating layer 2b, and firmly joined and fixed to the supporting substrate 2a of the basement layer 2. Here, the support 18j has functions as an electrode for applying an electrical signal and as a wiring.

On the other hand, the movable electrode 13b of the detecting means 13-1 to 13-4 is formed by patterning the active layer 2c. The movable electrode 13b is arranged in a floating state above the first main surface of the basement layer 2 as the insulating layer 2b under the movable electrode 13b is removed. The movable electrode 13b has the active layer 2c thereof being integrally formed and connected with the active layer 2c of the detection frame 12, and thus it is connected to the detection frame 12. The detecting means 13-1 to 13-4 having such a configuration detect the state of vibration of the detection frame 12 by changes in the capacitance between the oppositely facing surfaces of the fixed electrode 13a and the movable electrode 13b, and outputs the detected signal as a measurement result of acceleration or angular rate in the detecting direction (second direction, X-axis direction).

Figure 10:
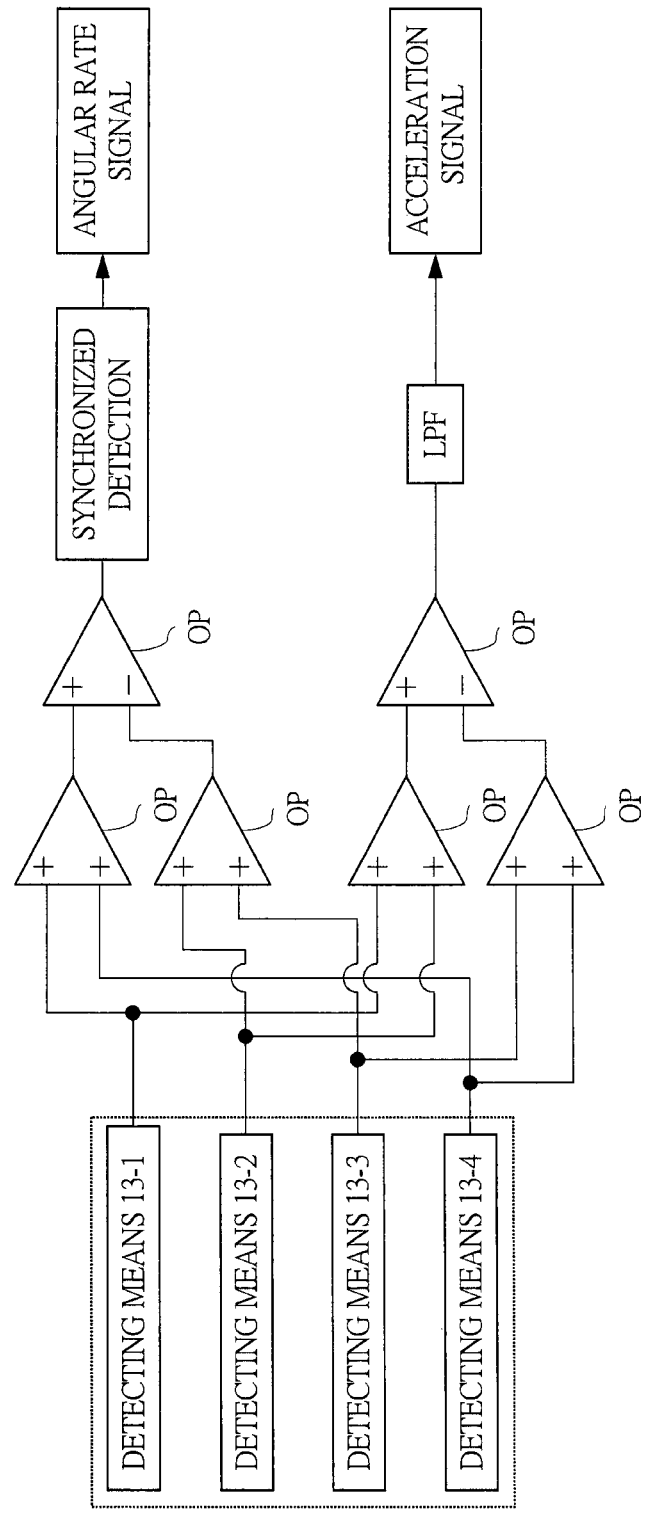
FIG. 10 is an explanatory diagram showing an example of a detecting circuit of the inertial sensor.

FIG. 10 schematically shows a method of detecting values of the acceleration and the angular rate in the detecting direction (second direction, X-axis direction) from changes in the capacitance obtained by such detecting means 13-1 to 13-4. The symbol OP denotes an operational amplifier. More specifically, the applied angular rate can be detected by taking a difference between a value obtained by adding capacitances of the detecting means 13-1 and the detecting means 13-4 and a value obtained by adding capacitances of the detecting means 13-2 and the detecting means 13-3. And, the acceleration applied in the detecting direction (second direction, X-axis direction) can be detected by taking a difference between a value obtained by adding capacitances of the detecting means 13-1 and the detecting means 13-2 and a value obtained by adding capacitances of the detecting means 13-3 and the detecting means 13-4. That is, the Coriolis force is generated when an angular rate about the Z axis is applied, and the Coriolis frame 11 is displaced in the detecting direction (second direction, X-axis direction) by the Coriolis force. Since the Coriolis frames 11 on the left and right are vibrated in opposite phases in the driving direction (first direction, Y-axis direction), the displacement amounts in the detecting direction (second direction, X-axis direction) by the Coriolis force are in opposite phases for the Coriolis frames 11 on the left and right. Accordingly, the displacement amounts in the detecting direction (second direction, X-axis direction) of the detection frames 12 on the left and right are also in opposite phases with each other. Therefore, the applied angular rate can be detected by taking a difference between a value obtained by adding capacitances of the detecting means 13-1 and the detecting means 13-4 and a value obtained by adding capacitances of the detecting means 13-2 and the detecting means 13-3. On the other hand, when an acceleration in the detecting direction (second direction, X-axis direction) is applied, the Coriolis frames 11 on the left and right are displaced in a same phase in the detecting direction (second direction, X-axis direction). Accordingly, the detection frames 12 on the left and right are also displaced in a same phase in the detecting direction (second direction, X-axis direction). Therefore, the acceleration applied in the detecting direction (second direction, X-axis direction) can be detected by taking a difference between a value obtained by adding capacitances of the detecting means 13-1 and the detecting means 13-2 and a value obtained by adding capacitances of the detecting means 13-3 and the detecting means 13-4.

In this manner, according to the inertial sensor 1A of the first embodiment, it is understood that an angular rate, an acceleration in a detecting direction (X-axis direction), and an acceleration in a driving direction (Y-axis direction) can be detected at the same time by one inertial sensor. More specifically, the driving-direction acceleration detecting unit 8 connected to the plurality of drive frames 5 vibrating in opposite phases via the elastic body is provided, thereby detecting the acceleration in the driving direction from the displacement amounts in a same phase of the plurality of drive frames 5. Consequently, as well as an angular rate and an acceleration in the detecting direction for detecting the angular rate, an acceleration in the driving direction that generates a basic vibration for measuring the angular rate can be detected at the same time. Therefore, it is not necessary to separately provide an inertial sensor for measuring an angular rate and an acceleration in a detecting direction (X-axis direction) and an inertial sensor for measuring an acceleration in a driving direction (Y-axis direction), thereby achieving down-sizing of the inertial sensor.

In addition, since the acceleration in the driving direction (Y-axis direction) can be measured or distinguished, a displacement error due to bias of the mass member made by the acceleration can be corrected, and a drive vibration which is strong against disturbance and always stable can be maintained, thereby improving the detection accuracy of angular rate.

Since the detection frame 12 is vibrated only in the detecting direction (second direction, X-axis direction), the area of the facing surfaces of the fixed electrode 13a and the movable electrode 13b of the detecting means 13-1 to 13-4 can be taken wider in principle as compared with the technique having a vibration couplings in the driving direction and the detecting direction. Therefore, the sensitivity and stability of the inertial sensor 1A can be improved.

Next, the angular rate servo means 14 is means for active control that generates a rebalancing force in accordance with the detected displacement amounts detected from the detecting means 13 so that the amplitude (amplitudes in opposite phases) by the angular rate applied to the detection frame 12 is always zero, and arranged on the inside of the detection frame 12. In other words, the angular rate servo means 14 has a function same with that of the driving-direction acceleration servo means 9 described above. The angular rate servo means 14 is formed by a plurality of fixed electrodes 14a and a plurality of movable electrode 14b alternately arranged along the detecting direction (second direction, X-axis direction) so as to engage with each other.

The fixed electrode 14a of the angular rate servo means 14 is formed by patterning the active layer 2c. The fixed electrode 14a has the active layer 2c thereof integrally formed with the active layer 2c of the support 18k, thereby being connected to the support 18k to be fixed to the basement layer 2. The support 18k is arranged on the outside of the drive frames 5 and the inside of the outer wall W in view of pull-put of wirings after cap (MCP) molding. The support 18k is formed by a stacked pattern of the active layer 2c and the insulating layer 2b, and firmly joined and fixed to the supporting substrate 2a of the basement layer 2. Here, the support 18k has functions as an electrode for applying an electrical signal to the fixed electrode 15a and as a wiring inside of the sensor units SUA1 and SUA2.

The detecting-direction acceleration servo means 15 is means for active control that generates a rebalancing force in accordance with the detected displacement amounts (displacement amounts in same phase) by the acceleration detected from the detecting means 13 so that the amplitude by the acceleration applied to the detection frame 13 is always zero. In other words, the detecting-direction acceleration servo means 15 has a same function as that of the driving-direction acceleration servo means 9 described above. The detecting-direction acceleration servo means 15 is formed by a plurality of fixed electrodes 15a and a plurality of movable electrodes 15b alternately arranged along the detecting direction (second direction, X-axis direction) so as to engage with each other. And, the rebalancing force is generated by applying a bias voltage across the plurality of fixed electrodes 15a and the movable electrodes 15b of the detecting-direction acceleration servo means 15. Therefore, it is configured that the applied acceleration can be measured by outputting the bias voltage itself.

The fixed electrode 15a of the detecting-direction acceleration servo means 15 is formed by patterning the active layer 2c. The fixed electrode 15a has the active layer 2c thereof integrally formed with the active layer 2c of the support 18l, thereby being connected to the support 18g to be fixed to the basement layer 2. The support 18l is arranged on the outside of the drive frames 5 and the inside of the outer wall W in view of pull-put of wirings after cap (MCP) molding. The support 18l is formed by a stacked pattern of the active layer 2c and the insulating layer 2b, and firmly joined and fixed to the supporting substrate 2a of the basement layer 2. Here, the support 18l has functions as an electrode for applying an electrical signal to the fixed electrode 15a and as a wiring inside of the sensor units SUA1 and SUA2.

On the other hand, the movable electrodes 14b and 15b of the angular rate servo means 14 and the detecting-direction acceleration servo means 15 are formed by patterning the active layer 2c. The movable electrodes 14b and 15b are arranged in a floating state above the first main surface of the basement layer 2 as the insulating layer 2b thereunder is removed. The movable electrodes 14b and 15b have the active layer 2c thereof being integrally formed and connected with the active layer 2c of the detection frame 12, thereby being connected to the detection frame 12.

Next, the detecting-direction resonance frequency tuning means 16 is means for actively controlling the resonance frequency of the detection frame 12, and arranged on the inside of the detection frame 12. The detecting-direction resonance frequency tuning means 16 has a same function as that of the driving-direction resonance frequency tuning means 10. The detecting-direction resonance frequency tuning means 16 is formed by a plurality of fixed electrodes 16a and a plurality of movable electrodes 16b alternately arranged along the detecting direction (second direction, X-axis direction) so as to engage with each other.

The fixed electrode 16a of the detecting-direction resonance frequency tuning means is formed by patterning the active layer 2c described above. The fixed electrode 16a has the active layer 2c thereof being integrally formed with the active layer of the support 18m, and is fixed to the basement layer 2 as being connected to the support 18m. The support 18m is formed by a stacked layer of the active layer 2c and the insulating layer 2b described above, and firmly joined and fixed to the base substrate 2a of the basement layer 2. Here, the support 18m has a function as an electrode for applying an electrical signal to the fixed electrode 16a.

On the other hand, the movable electrode 16b of the detecting-direction resonance frequency tuning means 16 is formed by patterning the active layer 2c. The movable electrode 16b is arranged in a floating state above the first main surface of the basement layer 2 as the insulating layer 2b thereunder is removed. The movable electrode 16b has the active layer 2c being integrally formed and connected with the active layer 2c of the detection frame 12, thereby being connected and fixed to the detection frame 12.

On the first main surface of the basement layer 2 as described above, the molding cap (MCP) is anodically bonded. In this manner, the sensor units SUA1 and SUA2 are sealed so that its movable part is provided in an appropriate pressured atmosphere. The molding cap MCP is made of, for example, Pyrex (Trade Mark) glass, and a plurality of electrodes 19 are provided so as to penetrate through the top and bottom surfaces (see FIG. 3). The electrodes 19 are electrodes for supplying desired electrical signals from the outside of the inertial sensor 1A to the sensor units SUA1 and SUA2 inside thereof, and connected to the supports 18a to 18m electrically.

Note that, the molding composition is not limited to that of the anodically bond, and various modifications are applicable. For example, the molding cap MCP can be bonded to the basement layer 2 by an adhesive material. And, after wire bonding, whole of the sensor units SUA1 and SUA2 can be molded by put into a package. In addition, the packaging can be made with mounting control circuits such as the driving means 6 and the detecting means 13 on the basement layer 2. Further, the electrodes for supplying desired electrical signals to the sensor units SUA1 and SUA2 can be drawn out from a second surface side (back surface side) of the basement layer 2. Alternatively, the sensor units SUA1 and SUA2 can be molded by forming a molding thin film by a chemical vapor deposition (CVD) and sputtering.

Second Embodiment

Figure 11:
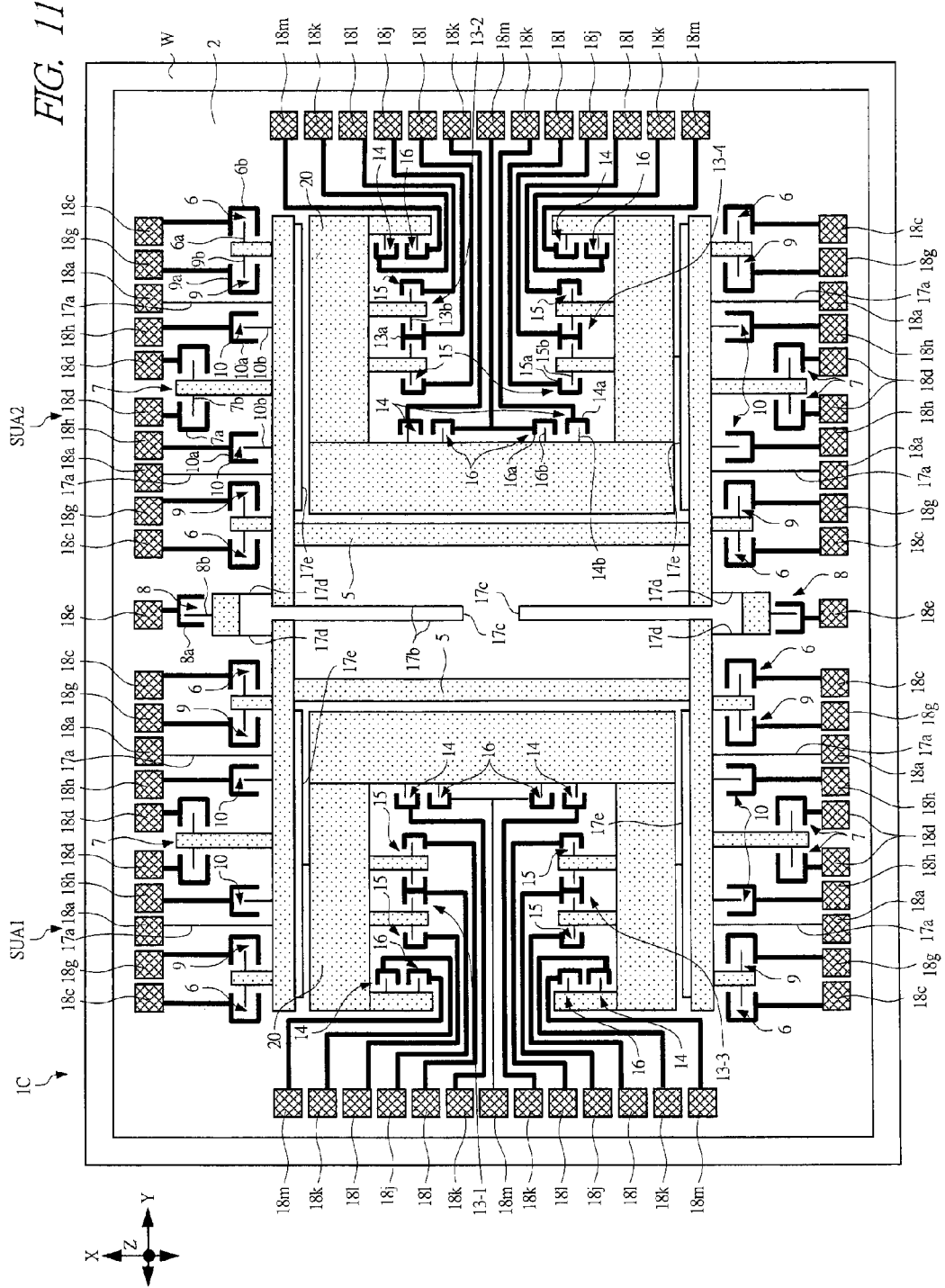
FIG. 11 is a planar view showing an example of an inertial sensor according to a second embodiment.

In a second embodiment, an example of integrating a Coriolis frame and a detection frame will be described. FIG. 11 is a planar view showing an example of an inertial sensor 1C according to the second embodiment. Note that, the molding cap is omitted in FIG. 11 for facilitating viewing.

In the second embodiment, a frame 20 is arranged inside of the drive frame 5 of the sensor units SUA1 and SUA2. The frame 20 is made by integrating the Coriolis frame 11 and the detection frame 12, and has functions of both of the Coriolis frame 11 and the detection frame 12. The frame 20 is connected to and supported by the drive frame 5 via the beam 17e, and formed by patterning the active layer 2c thereof in a planar substantially frame shape. And the frame 20 is arranged in a floating state above the first surface of the basement layer 2 as the insulating layer 2b thereunder is removed.

The detecting means 13-1 to 13-4 detect displacement amounts when the frame 20 is displaced in the detecting direction (second direction, X-axis direction) by an acceleration or an angular rate in the detecting direction (second direction, X-axis direction). On the inner circumference of the frame 20, the movable electrode 13b of the detecting means 13 described above is integrally formed and connected with the active layer 2c.

The angular rate servo means 14 and the detecting-direction acceleration servo means 15 actively control amplitudes of the frame 20 in the detecting direction (second direction, X-axis direction) to be always zero. At both ends of the detecting direction (second direction, X-axis direction), the movable electrodes 14b and 15b of the angular rate servo means 14 and the detecting-direction acceleration servo means 15 are integrally formed with the active layer 2c of the frame 20 and connected to the inner circumference of the frame 20. Other configurations than this is same as those of the first embodiment described above.

In the second embodiment, other than the effects obtained by the first embodiment, the following effects can be obtained. More particularly, by integrating the Coriolis frame and the detection frame, formation of the sensor units SUA1 and SUA2 can be made easy. And, by integrating the Coriolis frame and the detection frame, the inertial sensor 1C can be down-sized. Note that, in FIG. 11, while the effects of the invention are described based on the configuration of FIG. 4, the configurations of FIG. 2 and FIG. 8 can obtain same effects.

Third Embodiment

In a third embodiment, an application example of the inertial sensors 1A and 1C of the first and second embodiments will be described.

Figure 12:
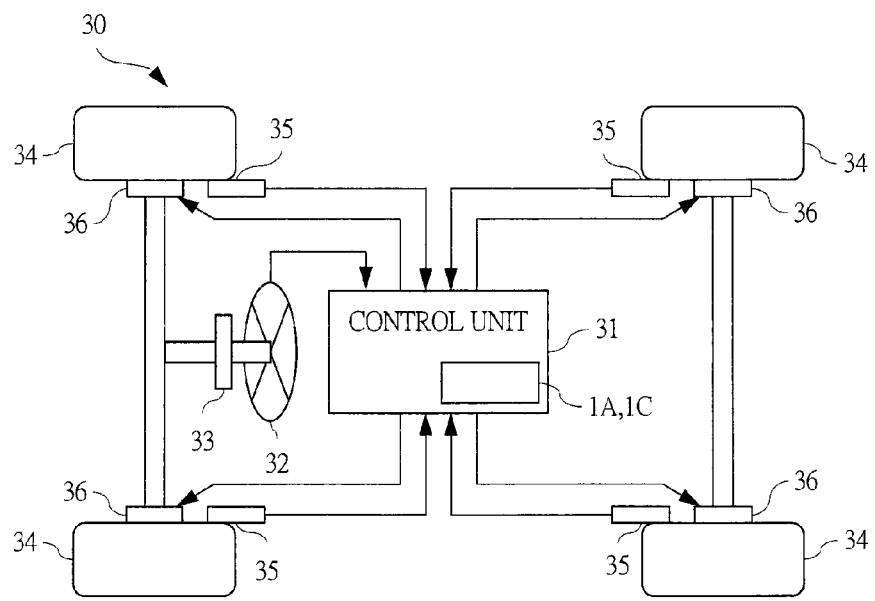
FIG. 12 is an explanatory diagram showing an example of adapting an inertial sensor according to a third embodiment to an antiskid brake system of vehicles.
Figure 13:
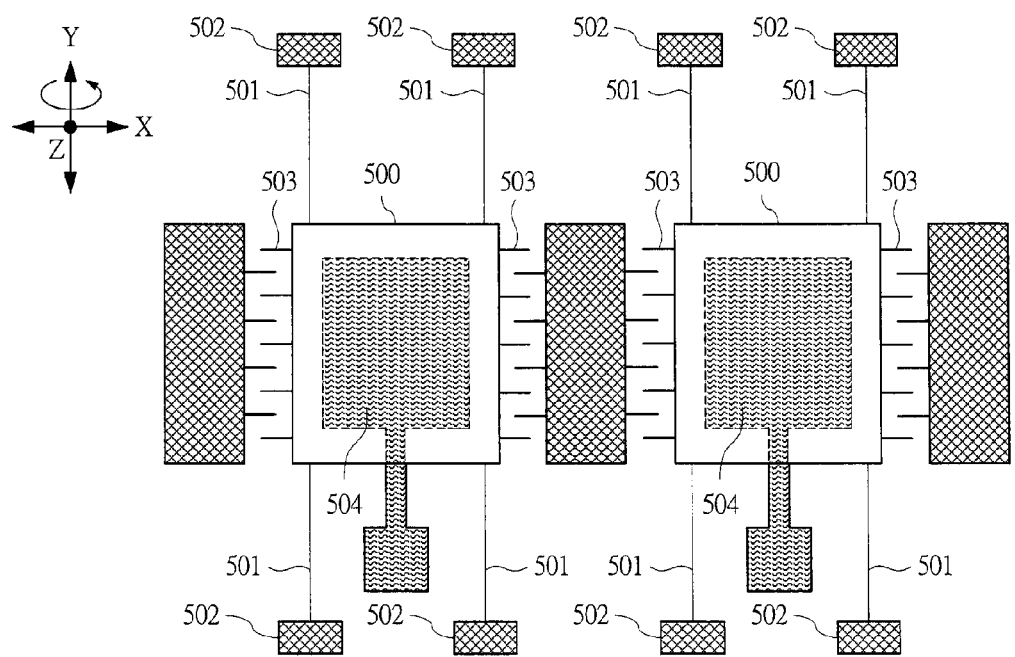
FIG. 13 is an explanatory diagram showing an example of an inertial sensor which the inventors of the present invention have studied.

FIG. 12 shows an example of applying the inertial sensor 1A or the inertial sensor 1C to an antiskid brake system of vehicles. The symbol 30 denotes a vehicle, 31 denotes a control unit, 32 denotes a steering operated by a driver, 33 denotes a serpentine angle sensor for detecting an operated amount of the steering 32, 34 denotes tires, 35 denotes a rotation sensor for detecting a rotational velocity of each of the tires, and 36 denotes a brake. The control unit 31 includes the inertial sensor 1A and the inertial sensor 1C.

First, the driver of the vehicle 30 operates the steering 32 for directing the vehicle to a willing direction. Then the operation amount of the steering 32 is detected by the serpentine angle sensor 33, and the detected signal is inputted to the control unit 31. And, the velocity of the vehicle 30 is detected by the rotation sensor 35, and the detected signal is inputted to the control unit 31. Here, when the vehicle 30 skids and starts spinning against the driver's will, the control unit 31 detects a difference between a movement of the vehicle 30 calculated by the operation amount of the steering 32 and the velocity of the vehicle 30 and the actual movement (angular rate and acceleration) of the vehicle 30 detected by the inertial sensor 1A or the inertial sensor 1C of the present embodiments, and controls the brake 36 to prevent the skid.

According to the present embodiment, the stability, sensitivity, and reliability of the inertial sensor 1A or the inertial sensor 1C can be improved as described above. Therefore, higher control can be achieved, and it is possible to guide the vehicle 30 to a safe situation.

In the foregoing, the invention made by the inventors of the present invention has been concretely described based on the embodiments. However, it is needless to say that the present invention is not limited to the foregoing embodiments and various modifications and alterations can be made within the scope of the present invention.

While the description above has been made about the case where the present invention made by the inventors is applied to an antiskid brake system of vehicles which is a background field of application of the present invention, it is not limited to this, and various modifications are applicable. For example, the present invention is applicable to other apparatuses for vehicles such as a collision detection device of airbags of vehicles and a vehicle navigation system. Further, the present invention is applicable to a sensor for measuring posture or movement state of a robot, a composure recognition sensor for mobile phones, and composure control of mobile electric devices such as notebook personal computers and digital cameras, for example, camera-shake correction and a sensor for drop detection etc.

The present invention is widely applicable to the manufacturing industry of MEMS inertial sensors.

What is claimed is:
1. An inertial sensor comprising:
a basement layer having a main surface;
a first drive frame connected to the basement layer via a first elastic body having higher rigidity in a second direction than in a first direction, the first direction being parallel to the main surface and the second direction crossing the first direction;
a first Coriolis frame connected to the first drive frame via a second elastic body having lower rigidity in the second direction than in the first direction;

a first driving unit which vibrates the first drive frame in the first direction;

a second drive frame connected to the basement layer via a third elastic body having higher rigidity in the second direction than in the first direction;

a second Coriolis frame connected to the second drive frame via a fourth elastic body having lower rigidity in the second direction than in the first direction;

a second driving unit which vibrates the second drive frame in the first direction; and a plurality of driving-direction acceleration detecting units, in which a first driving-direction acceleration detecting unit is connected to the first drive frame via a fifth elastic body, and a second driving-direction acceleration detecting unit is connected to the second drive frame via a sixth elastic body, wherein the first driving unit and the second driving unit vibrate the first drive frame and the second drive frame in opposite phases in the first direction.

2. The inertial sensor according to claim 1, further comprising:

first and second fixed electrodes, wherein the first driving-direction acceleration detecting unit includes a first movable electrode forming a first capacitance between the first fixed electrode, wherein the second driving-direction acceleration detecting unit includes a second movable electrode forming a second capacitance between the second electrode, and wherein an acceleration of the first direction is detected by taking a difference between a capacitance change of the first capacitance and a capacitance change of the second capacitance.

3. The inertial sensor according to claim 1, wherein the first and the second driving units are each formed by a capacitive element arranged in a comb-teeth shape and are configured to vibrate the first and second drive frames in the first direction based on an electrostatic attractive force applied to the capacitive element.

4. The inertial sensor according to claim 1, wherein an elastic body connecting the first drive frame and the second drive frame is fixed to the basement layer.

5. The inertial sensor according to claim 1, wherein an elastic body connecting the first drive frame and the second drive frame is not fixed to the basement layer.

6. The inertial sensor according to claim 1, wherein the basement layer is an SOI substrate.

7. The inertial sensor according to claim 1, wherein the first drive frame, the first Coriolis frame, the first driving unit, the second driving unit, the second Coriolis frame, and the second driving unit are formed of conductive silicon, conductive poly-silicon, or a metal.

8. The inertial sensor according to claim 1, further comprising:

a first detecting unit that detects a displacement amount of the first Coriolis frame in the second direction based on the vibration of the Coriolis frame in the second direction; and a second detecting unit that detects a displacement amount of the second Coriolis frame in the second direction based on the vibration of the Coriolis frame in the second direction.

9. The inertial sensor according to claim 8, wherein the first and the second detecting units are each formed by a capacitive element arranged in a comb-teeth shape, and wherein a displacement amount in the second direction is detected based on a capacitance change of the capacitive element.

10. The inertial sensor according to claim 8, wherein an angular rate and acceleration in the second direction are detected based on the displacement amount in the second direction detected by the first detecting unit and the displacement amount in the second direction detected by the second detecting unit.

11. The inertial sensor according to claim 1, further comprising:

a first detection frame that is connected to the first Coriolis frame and configured to vibrate in the second direction in a same phase with the vibration in the second direction of the first Coriolis frame;

a first detecting unit that detects a displacement amount of the first detection frame in the second direction based on the vibration in the second direction;

a second detection frame that is connected to the second Coriolis frame and configured to vibrate in the second direction in a same phase with the vibration in the second direction of the second Coriolis frame; and a second detecting unit that detects a displacement amount of the second detection frame in the second direction based on the vibration in the second direction.

12. The inertial sensor according to claim 11, wherein the first and the second detecting units are each formed by a capacitive element arranged in a comb-teeth shape, and wherein a displacement amount in the second direction is detected based on a capacitance change of the capacitive element.

13. The inertial sensor according to claim 11, wherein an angular rate and acceleration in the second direction are detected based on the displacement amount in the second direction detected by the first detecting unit and the displacement amount in the second direction detected by the second detecting unit.

* * * * *